US009369624B2

(12) United States Patent
Ishii et al.

(10) Patent No.: US 9,369,624 B2
(45) Date of Patent: Jun. 14, 2016

(54) IMAGING APPARATUS, IMAGING SYSTEM, IMAGING METHOD, AND COMPUTER PROGRAM PRODUCT SAVING PROGRAM

(71) Applicant: Olympus Corporation, Shibuya-ku, Tokyo (JP)

(72) Inventors: Kensuke Ishii, Tokyo (JP); Saori Matsumoto, Tokyo (JP); Arata Shinozaki, Tokyo (JP); Yoshitaka Sato, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/794,350

(22) Filed: Jul. 8, 2015

(65) Prior Publication Data

US 2015/0312466 A1 Oct. 29, 2015

Related U.S. Application Data

(63) Continuation of application No. PCT/JP2014/077313, filed on Oct. 14, 2014.

(30) Foreign Application Priority Data

Mar. 12, 2014 (JP) ................................. 2014-048880

(51) Int. Cl.
*H04N 5/232* (2006.01)
*H04N 5/225* (2006.01)
(Continued)

(52) U.S. Cl.
CPC .......... *H04N 5/23203* (2013.01); *H04N 1/2112* (2013.01); *H04N 5/225* (2013.01); *H04N 5/23216* (2013.01); *H04N 5/23293* (2013.01); *H04N 5/772* (2013.01); *H04N 9/8042* (2013.01)

(58) Field of Classification Search
CPC .......... H04N 5/23203; H04N 5/23216; H04N 5/23293
See application file for complete search history.

(56) References Cited

U.S. PATENT DOCUMENTS 7,602,421 B2 * 10/2009 Hunter ............... H04N 5/23206 348/211.3
2005/0007476 A1 1/2005 Miyake
(Continued)

FOREIGN PATENT DOCUMENTS

JP 2004-096165 3/2004
JP A-2005-033454 2/2005
(Continued)

OTHER PUBLICATIONS

International Search Report to International Application No. PCT/JP2014/077313, mailed on Jan. 20, 2015 (2 pgs.), with translation (1 pg.).
(Continued)

*Primary Examiner* — James Hannett
(74) *Attorney, Agent, or Firm* — John C. Pokotylo; Straub & Pokotylo

(57) ABSTRACT

An imaging apparatus includes an imaging module configured to continuously generate a live image and perform capture to generate still images, an operation interface configured to receive an operation of a user who inputs a first capturing command, a communication module configured to transmit the live image to a display apparatus and receive a second capturing command from the display apparatus, a transmission detection unit configured to detect whether the live image is being transmitted to the display apparatus, an information addition unit configured to add transmission information indicating whether the transmission of the live image is being performed before the first capturing command is input or the second capturing command is received to the still images generated based on the first capturing command or the second capturing command, and a storage module configured to store the still images with the transmission information.

14 Claims, 19 Drawing Sheets

(51) Int. Cl.
*H04N 1/21* (2006.01)
*H04N 5/77* (2006.01)
*H04N 9/804* (2006.01)

(56) References Cited

U.S. PATENT DOCUMENTS

2006/0285004 A1  12/2006  Suemoto
2012/0086817 A1   4/2012  Yamamoto

FOREIGN PATENT DOCUMENTS

| JP | A-2006-173908 | 6/2006 |
| JP | A-2007-142661 | 6/2007 |
| JP | A-2007-279486 | 10/2007 |
| JP | A-2010-263324 | 11/2010 |
| JP | 2011-087167 | 4/2011 |
| JP | 2012-084973 | 4/2012 |
| JP | 2012-099889 | 5/2012 |

OTHER PUBLICATIONS

Written Opinion to International Application No. PCT/JP2014/077313, mailed on Jan. 20, 2015 (3 pgs.), with translation (3 pgs.).
Notice of Allowance to Japanese Patent Application No. 2015-081778, mailed on Apr. 5, 2016 (3 pgs.), with translation (3 pgs.).

* cited by examiner

IMAGING APPARATUS, IMAGING SYSTEM, IMAGING METHOD, AND COMPUTER PROGRAM PRODUCT SAVING PROGRAM

BACKGROUND OF THE INVENTION

1. Field of the Invention

The present invention relates to a technology for capturing a still image. The present application is based on and claims priority under Japanese Patent Application No. 2014-048880 filed Mar. 12, 2014, and is a continuous application based on PCT/JP2014/077313 filed Oct. 14, 2014, the content of the Japanese Patent Application and the PCT application is incorporated herein by reference.

2. Description of Related Art

In general, when an imaging apparatus such as a digital camera captures a still image, a user sees a live image (a moving image) continuously displayed on a display interface, confirms composition, focus, exposure and the like, and then inputs a capturing command. On the other hand, Japanese Unexamined Patent Application, First Publication No. 2006-173908 discloses a technology for distinguishing a still image acquired simultaneously with the capturing and recording of a moving image from a still image acquired when the capture of the moving image has not been performed.

Even in an imaging system having both an imaging apparatus and a display apparatus that performs the display of an image transmitted from the imaging apparatus and the control of the imaging apparatus, it is possible to capture a still image in a method similar to a general capturing method. For example, a live image continuously transmitted from the imaging apparatus is displayed by the display apparatus. A user sees the live image, confirms composition and the like, and then inputs a capturing command to the display apparatus. The input capturing command is transmitted to the imaging apparatus, and the imaging apparatus having received the capturing command performs capturing to generate a still image.

In the aforementioned imaging system, with respect to an actual photo opportunity, a capturing timing is delayed by a time obtained by adding a time required for the transmission and display of a live image to a time required for the transmission of the capturing command. Furthermore, when communication between the imaging apparatus and the display apparatus is performed in a wireless manner, since a time is required for the setting and the like of wireless communication in capturing immediately after the imaging apparatus and the display apparatus start to operate, the photo opportunity may be lost. Furthermore, since power is used in the transmission, reception, and display of the live image, when the battery level is low, capturing may not be performed.

Therefore, there is demand for capturing a still image by the input and the like of the capturing command to the imaging apparatus without confirming the live image displayed on the display apparatus. In such capturing, it is possible to easily and immediately capture a still image without confirming composition and the like according to the live image. For the convenience of various processes performed after the capturing, it is preferable to distinguish a still image generated by capture performed without displaying the live image from a still image generated by typical capturing performed after the live image is displayed. In this way, for example, it is possible later to preferentially display a still image generated without confirmation according to the live image, and to allow a user to confirm the content.

SUMMARY OF THE INVENTION

According to a first aspect of the present invention, an imaging apparatus includes: an imaging module configured to continuously generate a live image and perform capture to generate still images; an operation interface configured to receive an operation of a user who inputs a first capturing command; a communication module configured to transmit the live image to a display apparatus and receive a second capturing command from the display apparatus, wherein the display apparatus parallelly receives and displays the live image; a transmission detection unit configured to detect whether the live image is being transmitted to the display apparatus; an information addition unit configured to add transmission information indicating whether the transmission of the live image is being performed before the first capturing command is input or the second capturing command is received to the still images generated based on the first capturing command or the second capturing command; and a storage module configured to store the still images with the transmission information.

According to a second aspect of the present invention, the imaging apparatus according to the first aspect may further include an image selection unit configured to select the still image with the transmission information indicating that the transmission of the live image is not performed from the still images stored in the storage module, and the communication module may further transmit the still image selected by the image selection unit to the display apparatus.

According to a third aspect of the present invention, the imaging apparatus according to the second aspect may further include an image processing unit configured to perform an image process on the still image selected by the image selection unit, and the communication module may transmit the still image processed by the image processing unit to the display apparatus.

According to a fourth aspect of the present invention, the imaging apparatus according to the first aspect may further include a capture control unit configured to control an imaging parameter of the imaging module when the transmission of the live image is not being performed before the first capturing command is input or the second capturing command is received.

According to a fifth aspect of the present invention, the imaging apparatus according to the first aspect may further include a display interface detection unit configured to detect whether a display interface is mounted on the imaging apparatus, wherein the display interface is detachable from the imaging apparatus and displaying an optical image of an object or the live image. The information addition unit may further add mounting information indicating whether the display interface is mounted on the imaging apparatus before the first capturing command is input or the second capturing command is received to the still images generated based on the first capturing command or the second capturing command. The storage module may store the still images with the transmission information and the mounting information.

According to a sixth aspect of the present invention, the imaging apparatus according to the fifth aspect may further include an image selection unit configured to select the still image with both the transmission information indicating that the transmission of the live image was not performed and mounting information indicating that the display interface was mounted from the still images stored in the storage module, and an image processing unit configured to perform an image process on the still image selected by the image selection unit. The communication module may further transmit the still image processed by the image processing unit to the display apparatus.

According to a seventh aspect of the present invention, in the imaging apparatus according to the sixth aspect, the display interface detection unit may further identify a type of the display interface when it is detected that the display interface is mounted on the imaging apparatus. The information addition unit may add mounting information to the still images generated based on the first capturing command or the second capturing command, wherein the mounting information indicates whether the display interface is mounted on the imaging apparatus before the first capturing command is input or the second capturing command is received and indicates the type of the display interface when the display interface is mounted on the imaging apparatus. The image processing unit may perform an image process according to the type of the display interface indicated by the mounting information on the still image selected by the image selection unit.

According to an eighth aspect of the present invention, an imaging system includes an imaging apparatus and a display apparatus. The imaging apparatus includes: an imaging module configured to continuously generate a live image and perform capture to generate still images; a first operation interface configured to receive an operation of a user who inputs a first capturing command; a first communication module configured to transmit the live image to the display apparatus and receive a second capturing command from the display apparatus; a transmission detection unit configured to detect whether the live image is being transmitted to the display apparatus; an information addition unit configured to add transmission information indicating whether the transmission of the live image is being performed before the first capturing command is input or the second capturing command is received to the still images generated based on the first capturing command or the second capturing command; and a storage module configured to store the still images with the transmission information. The display apparatus includes: a second operation interface configured to receive an operation of a user who inputs the second capturing command; a second communication module configured to receive the live image from the imaging apparatus and transmit the second capturing command to the imaging apparatus; and an image display interface configured to receive and display the live image.

According to a ninth aspect of the present invention, in the imaging system according to the eighth aspect, the first communication module may further transmit the transmission information, identification information for identifying the still image with the transmission information, and the still image to be transmitted to the display apparatus, and receives designation information for designating the still image to be transmitted from the display apparatus. The second communication module may further receive the transmission information, the identification information, and the still image to be transmitted from the imaging apparatus, and transmit the designation information to the imaging apparatus. The display apparatus may further include an image designation unit configured to generate the designation information from the identification information corresponding to the transmission information indicating that the transmission of the live image is not being performed.

According to a tenth aspect of the present invention, in the imaging system according to the eighth aspect, the first communication module may further transmit the still image and the transmission information to the display apparatus. The second communication module may further receive the still image and the transmission information from the imaging apparatus. The display apparatus may further include: an image selection unit configured to select the still image with the transmission information indicating that the transmission of the live image was not performed from the still images received by the second communication module; and an image processing unit configured to perform an image process on the still image selected by the image selection unit.

According to an eleventh aspect of the present invention, in the imaging system according to the eighth aspect, the imaging apparatus may further include a display interface detection unit configured to detect whether a display interface is mounted on the imaging apparatus, the display interface being detachable from the imaging apparatus and displaying an optical image of an object or the live image. The first communication module may further transmit the still image, the transmission information, and mounting information indicating whether the display interface is mounted on the imaging apparatus before the first capturing command is input or the second capturing command is received to the display apparatus. The information addition unit may further add the mounting information to the still images generated based on the first capturing command or the second capturing command. The storage module may store the still images with both the transmission information and the mounting information. The second communication module may further receive the still image, the transmission information, and the mounting information from the imaging apparatus. The display apparatus may further include: an image selection unit configured to select the still image with both the transmission information indicating that the transmission of the live image was not performed and mounting information indicating that the display interface was mounted on the imaging apparatus from the still images received by the second communication module; and an image processing unit configured to perform an image process on the still image selected by the image selection unit.

According to a twelfth aspect of the present invention, in the imaging system according to the eleventh aspect, the display interface detection unit may further identify the type of the display interface when it is detected that the display interface is mounted on the imaging apparatus. The information addition unit may add mounting information indicating whether the display interface is mounted on the imaging apparatus before the first capturing command is input or the second capturing command is received and indicates the type of the display interface when the display interface is mounted on the imaging apparatus to the still images generated based on the first capturing command or the second capturing command. The image processing unit may perform an image process according to the type of the display interface indicated by the mounting information on the still image selected by the image selection unit.

According to a thirteenth aspect of the present invention, an imaging method includes: a step in which a transmission detection unit configured to detect whether a live image is being transmitted to a display apparatus that parallelly receives and displays the live image continuously generated by an imaging module performs detection; a step in which the imaging module performs capturing to generate a still image when a first capturing command is input via an operation interface or when a second capturing command is received from the display apparatus by a communication module; a step in which an information addition unit configured to add transmission information indicating whether the transmission of the live image is being performed before the first capturing command is input or the second capturing command is received to a still image generated based on the first capturing command or the second capturing command performs addition; and a step in which a storage module stores the still image with the transmission information.

According to a fourteenth aspect of the present invention, a computer program product saving a program causing a computer to execute: a step of allowing a transmission detection unit configured to detect whether a live image is being transmitted to a display apparatus that parallelly receives and displays the live image continuously generated by an imaging module to perform detection; a step of allowing the imaging module to perform capture to generate a still image when a first capturing command is input via an operation interface or when a second capturing command is received from the display apparatus by a communication module; a step of adding transmission information indicating whether the transmission of the live image is being performed before the first capturing command is input or the second capturing command is received to the still image generated based on the first capturing command or the second capturing command; and a step of allowing a storage module to store the still image with the transmission information.

DETAILED DESCRIPTION OF THE INVENTION

Hereinafter, embodiments of the present invention will be described with reference to the drawings.

(First Embodiment)

Figure 1:
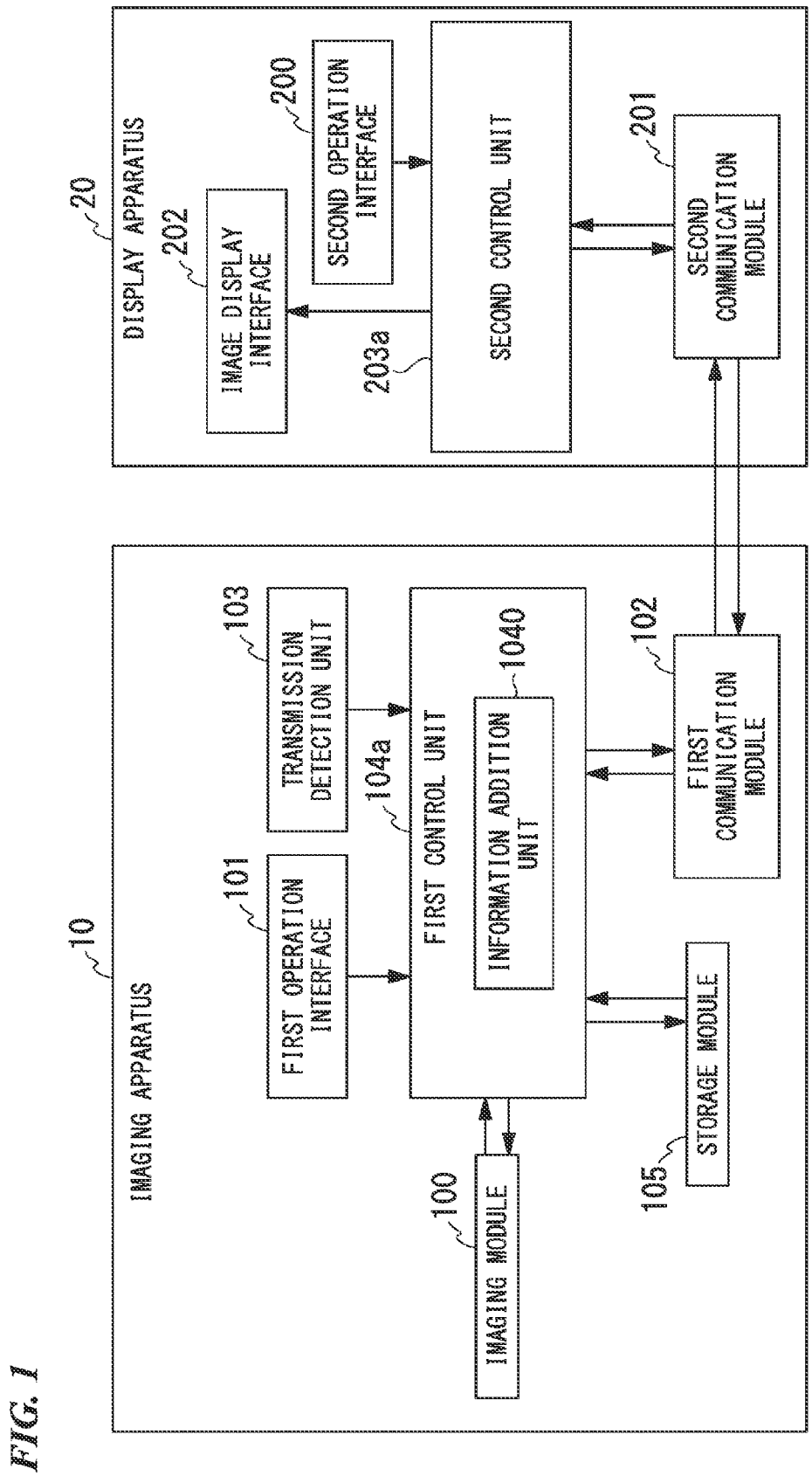
FIG. 1 is a block diagram showing a configuration example of an imaging system according to a first embodiment of the present invention.

First, a first embodiment of the present invention will be described. FIG. 1 shows a configuration example of an imaging system according to the present embodiment. The imaging system showed in FIG. 1 includes an imaging apparatus 10 and a display apparatus 20.

The imaging apparatus 10 includes an imaging module 100, a first operation interface (a first operation IF) 101, a first communication module 102, a transmission detection unit 103, a first control unit 104a, and a storage module 105.

The imaging module 100 (an imaging device) continuously generates a live image and performs capturing to generate a still image. The live image is individual images (images generated in each frame) constituting a moving image. Furthermore, the live image includes image data for displaying an image. The still image is an image recorded on a nonvolatile recording medium. Furthermore, the still image includes image data for displaying an image. The number of pixels (a resolution) of the live image and the number of pixels (a resolution) of the still image may be different from each other.

The first operation interface 101 (a first operation module or a first operation device) receives the operation of a user who inputs a first capturing command. For example, the first operation interface 101 is a shutter button (a release switch) provided on the imaging apparatus 10.

The first communication module 102 (a first communication interface or a first communication device) transmits the live image to the display apparatus 20 that parallelly receives and displays the live image, and receives a second capturing command from the display apparatus 20.

The transmission detection unit 103 detects whether the live image is being transmitted to the display apparatus 20. The display apparatus 20 is an apparatus that receives the live image from the imaging apparatus 10 in order to display the live image. When the live image is being transmitted to the display apparatus 20 at the time of performing capturing, the live image is displayed on the display apparatus 20, so that a user can see the live image and confirm composition and the like.

The first control unit 104a is a control module (a control device) of a CPU (Central Processing Unit) and the like, and controls the operation of the imaging apparatus 10. For example, when the first capturing command is input via the first operation interface 101 or when the second capturing command is received by the first communication module 102, the first control unit 104a controls the imaging module 100 to perform capture to generate a still image. The second capturing command is one of commands for controlling the imaging apparatus 10, which is transmitted by the display apparatus 20.

In the present embodiment, the first control unit 104*a* has an information addition unit 1040. The information addition unit 1040 adds transmission information indicating whether the transmission of the live image is being performed before the first capturing command is input or the second capturing command is received to the still image generated by the imaging module 100 based on the first capturing command or the second capturing command. The transmission information is information indicating whether the transmission of the live image was being performed at the time of performing capture and is information indicating whether the live image was displayed by the display apparatus 20 at the time of capturing.

For example, the transmission information is added to the still image by embedding the transmission information in a file of the still image. For example, the transmission information may be included in EXIF (Exchangeable Image File Format) information embedded in the file of the still image. Furthermore, the transmission information is included in files separate from the file of the still image and these files are correlated with each other, so that the transmission information may be added to the still image. For example, information (for example, identification information (a file name and the like) of a file of the still image) for referring to the still image may also be included in a file including the transmission information.

The storage module 105 (a storage device) is a nonvolatile recording medium such as a memory installed in the imaging apparatus 10, and stores the still image to which the transmission information has been added.

The display apparatus 20 includes a second operation interface (a second operation IF) 200, a second communication module 201, an image display interface (an image display IF) 202, and a second control unit 203*a*.

The second operation interface 200 (a second operation module or a second operation device) receives the operation of a user who inputs the second capturing command. For example, the second operation interface 200 is a button (a switch) provided on the display apparatus 20. When the image display interface 202 is configured by a touch panel, the second operation interface 200 may be a button and the like displayed on the image display interface 202.

The second communication module 201 (a second communication interface or a second communication device) receives the live image from the imaging apparatus 10, and transmits the second capturing command input via the second operation interface 200 to the imaging apparatus 10.

The image display interface 202 (an image display module or an image display device) parallelly receives and displays the live image. In the display apparatus 20, the reception of the live image and the display of the live image, for example, are performed as a set of operations.

The second control unit 203*a* is a control module (a control device) of a CPU and the like, and controls the operation of the display apparatus 20. For example, when a live image of one frame is received by the second communication module 201, the second control unit 203*a* outputs the received live image to the image display interface 202 before a live image of a next frame is received and allows the live image to be displayed on the image display interface 202.

Communication between the imaging apparatus 10 and the display apparatus 20, which is performed by the first communication module 102 and the second communication module 201, may be any one of wireless communication and wired communication.

The function of the first control unit 104*a* or the second control unit 203*a*, for example, can be performed as a software function when a computer of the imaging apparatus 10 or the display apparatus 20 reads a program including a command for regulating the operation of the first control unit 104*a* or the second control unit 203*a*. Furthermore, the program, for example, may be provided by a "computer-readable recording medium" such as a flash memory. Furthermore, the aforementioned program may be transmitted from a computer stored in a storage device and the like to the imaging apparatus 10 or the display apparatus 20 via a transmission medium or transmission waves of the transmission medium, so that the aforementioned program may be input to the imaging apparatus 10 or the display apparatus 20. The "transmission medium" for transmitting the program is a medium having a function of transmitting information, such as a network (a communication network) such as the Internet or a communication line such as a telephone line. Furthermore, the aforementioned program may realize some of the aforementioned functions. Moreover, the aforementioned program may also be a program capable of realizing the aforementioned functions in combination with a program previously recorded in the computer, that is, a difference file (a difference program).

Hereinafter, an example of a method in which the transmission detection unit 103 detects whether the live image is being transmitted to the display apparatus 20 will be described. For example, the transmission detection unit 103 detects whether the live image is being transmitted by detecting the state of a switch for switching the operation of the first communication module 102 ON and OFF. When the state of the switch of the first communication module 102 is an ON state, the transmission detection unit 103 detects that the transmission of the live image is being performed. Furthermore, when the state of the switch of the first communication module 102 is an OFF state, the transmission detection unit 103 detects that the transmission of the live image is not being performed. The detection of the state of the switch may be performed by mechanical detection or electrical detection.

Alternatively, the transmission detection unit 103 may also detect whether the live image is being transmitted by detecting whether power is being supplied to the first communication module 102. When power is supplied to the first communication module 102, the transmission detection unit 103 detects that the transmission of the live image is being performed. Furthermore, when no power is supplied to the first communication module 102, the transmission detection unit 103 detects that the transmission of the live image is not being performed. The detection of whether the power is being supplied may be performed by detecting a voltage or a current for driving input to the first communication module 102.

Alternatively, the transmission detection unit 103 may also detect whether the live image is being transmitted by detecting whether a display interface is mounted on the imaging apparatus 10. The display interface is detachable from the imaging apparatus 10, and displays an optical image of an object or a live image. The imaging apparatus 10 can be mounted with an OVF (Optical View Finder), which is a display interface for displaying the optical image of the object, or an EVF (Electronic View Finder) which is a display interface for displaying the live image generated by the imaging module 100. A user can see the OVF or the EVF, confirm composition and the like, and then perform capture of a still image.

In general, a display interface mounted on the display apparatus has a display area larger than that of the OVF or the EVF mounted on the imaging apparatus. Furthermore, a view range captured by the OVF does not always coincide with a view range captured by an imaging lens. Therefore, when confirmation is performed through the OVF or the EVF, it is more difficult to sufficiently confirm composition and the like than when confirmation is performed using a live image displayed on the display interface of the display apparatus.

In the present embodiment, the use of the OVF or the EVF and the use of the display apparatus 20 are exclusive to each other. That is, when the OVF or the EVF is mounted on the imaging apparatus 10, the transmission of the live image is not performed. Only when neither the OVF nor the EVF is mounted on the imaging apparatus 10 is the transmission of the live image performed.

When neither the OVF nor the EVF is mounted on the imaging apparatus 10, the transmission detection unit 103 detects that the transmission of the live image is being performed. Furthermore, when the OVF or the EVF is mounted on the imaging apparatus 10, the transmission detection unit 103 detects that the transmission of the live image is not being performed. The detection regarding whether the OVF or the EVF is mounted on the imaging apparatus 10 may be performed by mechanical detection or electrical detection.

Figure 2:
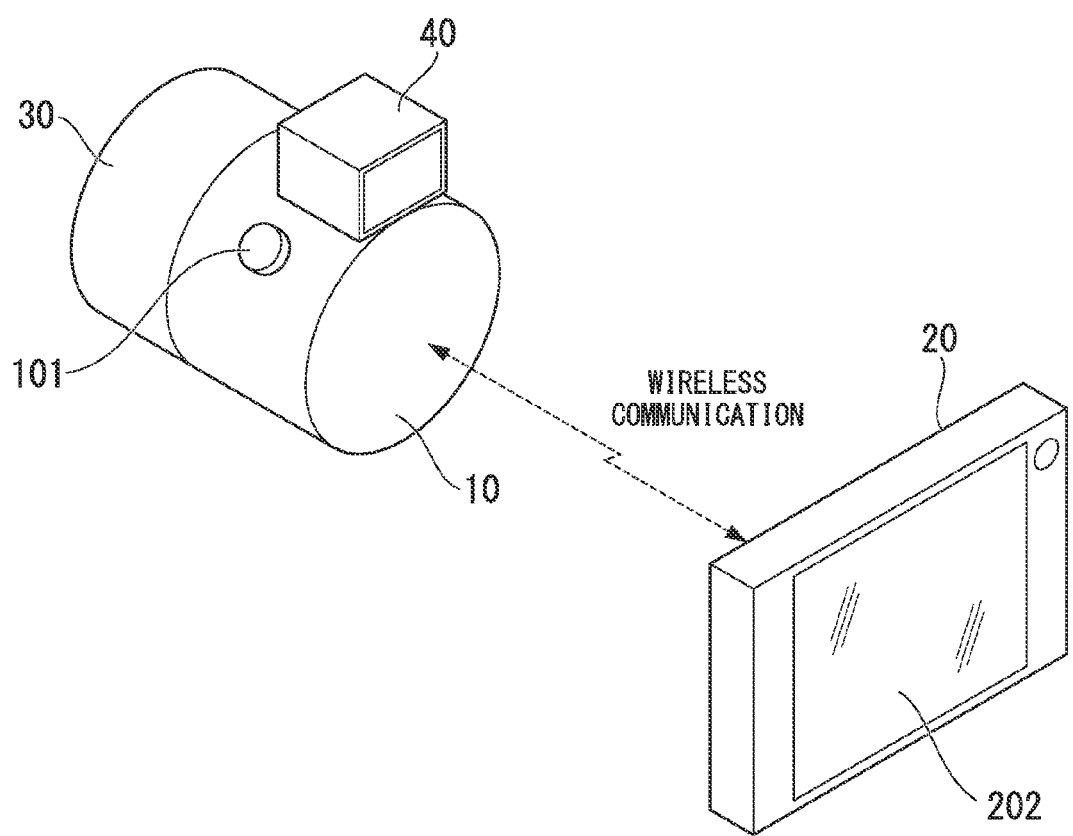
FIG. 2 is an outline view showing a detailed configuration example of an imaging system according to a first embodiment of the present invention.

FIG. 2 shows a detailed configuration example of the imaging system according to the present embodiment. The imaging system showed in FIG. 2 includes the imaging apparatus 10, the display apparatus 20, and an imaging lens 30.

The imaging apparatus 10 and the display apparatus 20 are connected to each other through wireless communication. The imaging apparatus 10 and the display apparatus 20 may not always be in contact with each other. The imaging apparatus 10 has the side surface mounted with the first operation interface 101 configured as a shutter button. A user presses the first operation interface 101 so that the first capturing command is input. Furthermore, a display interface 40, which is the OVF or the EVF, can be mounted on the side surface of the imaging apparatus 10.

The imaging apparatus 10 has the front surface mounted with the imaging lens 30. The imaging lens 30 is detachable from the imaging apparatus 10. The imaging apparatus 10 and the imaging lens 30 may be integrally formed with each other.

The display apparatus 20 has the rear surface mounted with the image display interface 202. A user can see the live image displayed on the image display interface 202 and thereby confirm composition and the like.

Figure 3:
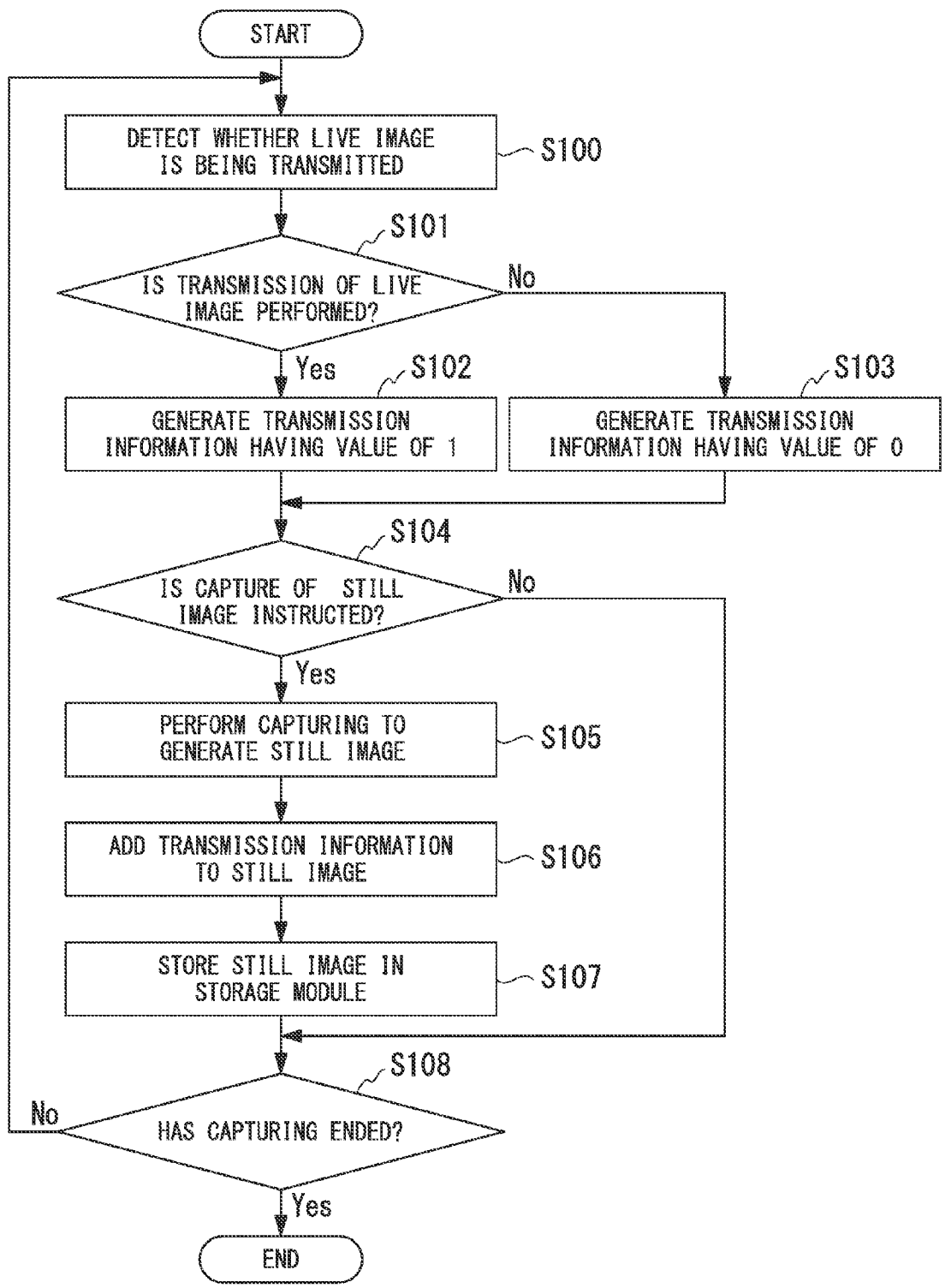
FIG. 3 is a flowchart showing an example of a procedure of an operation of an imaging apparatus according to a first embodiment of the present invention.

FIG. 3 shows an example of a procedure of the operation of the imaging apparatus 10. The operation of the imaging apparatus 10 will be described with reference to FIG. 3. When a transmission command of a live image is received from the display apparatus 20, the imaging module 100 starts the generation of a live image, and the first communication module 102 transmits the live image to the display apparatus 20. FIG. 3 does not show the generation and transmission of the live image.

When a procedure of a capturing mode is started, the first control unit 104a allows the transmission detection unit 103 to detect whether a live image is being transmitted to the display apparatus 20 (step S100). In this way, the transmission detection unit 103 detects whether the live image is being transmitted to the display apparatus 20. The first control unit 104a is notified of the detection result of the transmission detection unit 103.

After the transmission detection unit 103 performs the detection, the first control unit 104a determines whether the transmission of the live image is being performed based on the detection result of the transmission detection unit 103 (step S101). When it is determined that the transmission of the live image is being performed, the information addition unit 1040 generates transmission information having a value of 1 (step S102). When it is determined that the transmission of the live image is not being performed, the information addition unit 1040 generates transmission information having a value of 0 (step S103). When transmission information has been previously generated, new transmission information is not generated in step S102 and step S103 and a value of the transmission information may be rewritten.

As described above, the transmission information is information indicating whether the transmission of the live image is being performed before the first capturing command is input via the first operation interface 101 or the second capturing command is received by the first communication module 102. It is sufficient if the value of the transmission information is a value by which it can be distinguished whether the live image is being transmitted, and the value of the transmission information may be a value other than 0 and 1.

After the transmission information is generated, the first control unit 104a determines whether the capture of a still image has been instructed (step S104). When the first capturing command is input via the first operation interface 101 or when the second capturing command is received by the first communication module 102, it is determined that the capture of the still image has been instructed. Furthermore, when the first capturing command is not input via the first operation interface 101 or when the second capturing command is not received by the first communication module 102, it is determined that the capture of the still image has not been instructed.

When it is determined that the capture of the still image has not been instructed, a process of step S108 is performed. Furthermore, when it is determined that the capture of the still image has been instructed, the first control unit 104a transmits a capturing command of the still image to the imaging module 100 and allows the imaging module 100 to perform capture and generate the still image (step S105). In this way, the imaging module 100 generates the still image by performing the capturing. The generated still image is output to the first control unit 104a.

After the still image is generated, the information addition unit 1040 adds the transmission information generated in step S102 or step S103 to the still image generated in step S105 based on the first capturing command or the second capturing command (step S106). After the transmission information is added to the still image, the first control unit 104a stores the still image with the transmission information in the storage module 105 (step S107). In this way, the storage module 105 stores the still image with the transmission information. When the transmission information is embedded in the still image, the transmission information is stored in the storage module 105 by storing the still image in the storage module 105. When the still image and the transmission information are separate and correlated, they are individually stored in the storage module 105.

After the still image is stored in the storage module 105, the first control unit 104a determines whether to end the capturing (step S108). When a capturing end command is input via the first operation interface 101 or when a capturing end command is received by the first communication module 102, it is determined to end the capturing. Furthermore, when the capturing end command is not input via the first operation interface 101 or when the capturing end command is not received by the first communication module 102, it is determined not to end the capturing.

When it is determined to end the capturing, the procedure of the capturing mode is ended. Furthermore, when it is determined not to end the capturing, the process of step S100 is performed. After the process of step S107 is performed, the procedure of the capturing mode may be forcibly ended without performing the determination of step S108.

The present embodiment provides the imaging apparatus 10 which is an imaging apparatus including the imaging module 100 that continuously generates the live image and performs capturing to generate the still images, the operation interface (the first operation interface 101) that receives the operation of a user who inputs the first capturing command, the communication module (the first communication module 102) that transmits the live image to the display apparatus 20 that parallelly receives and displays the live image and receives the second capturing command from the display apparatus 20, the transmission detection unit 103 that detects whether the live image is being transmitted to the display apparatus 20, the information addition unit 1040 that adds the transmission information indicating whether the transmission of the live image is being performed before the first capturing command is input or the second capturing command is received to the still images generated based on the first capturing command or the second capturing command, and the storage module 105 that stores the still images with the transmission information.

Furthermore, the present embodiment provides the imaging system including the imaging apparatus 10 and the display apparatus 20, wherein, in the imaging system, the imaging apparatus 10 includes the imaging module 100 that continuously generates the live image and performs capturing to generate the still images, the first operation interface 101 that receives the operation of a user who inputs the first capturing command, the first communication module 102 that transmits the live image to the display apparatus 20 and receives the second capturing command from the display apparatus 20, the transmission detection unit 103 that detects whether the live image is being transmitted to the display apparatus 20, the information addition unit 1040 that adds the transmission information indicating whether the transmission of the live image is being performed before the first capturing command is input or the second capturing command is received to the still images generated based on the first capturing command or the second capturing command, and the storage module 105 that stores the still images with the transmission information, and the display apparatus 20 includes the second operation interface 200 that receives the operation of a user who inputs the second capturing command, the second communication module 201 that receives the live image from the imaging apparatus 10 and transmits the second capturing command to the imaging apparatus 10, and the image display interface 202 that parallelly receives and displays the live image.

Furthermore, the present embodiment provides an imaging method including a step S100 in which the transmission detection unit 103 configured to detect whether the live image is being transmitted to the display apparatus 20 that parallelly receives and displays the live image continuously generated by the imaging module 100 performs detection, a step S105 in which the imaging module 100 performs capturing to generate the still images when the first capturing command is input via the operation interface (the first operation interface 101) or when the second capturing command is received from the display apparatus 20 by the communication module (the first communication module 102), a step S106 in which the information addition unit 1040 configured to add the transmission information indicating whether the transmission of the live image is being performed before the first capturing command is input or the second capturing command is received to the still images generated based on the first capturing command or the second capturing command performs addition, and a step S107 in which the storage module 105 stores the still images with the transmission information.

Furthermore, the present embodiment provides a program causing a computer to execute a step S100 of allowing the transmission detection unit 103 configured to detect whether the live image is being transmitted to the display apparatus 20 that parallelly receives and displays the live image continuously generated by the imaging module 100 to perform detection, a step S105 of allowing the imaging module 100 to perform capture to generate the still images when the first capturing command is input via the operation interface (the first operation interface 101) or when the second capturing command is received from the display apparatus 20 by the communication module (the first communication module 102), a step S106 of adding the transmission information indicating whether the transmission of the live image is being performed before the first capturing command is input or the second capturing command is received from the display apparatus 20 to the still images generated based on the first capturing command or the second capturing command, and a step S107 of storing the still images with the transmission information in the storage module 105.

In the present embodiment, it is detected whether the live image is being transmitted to the display apparatus 20 that parallelly receives and displays the live image, and the transmission information indicating whether the transmission of the live image is being performed is added to the still images. In this way, it is possible to capture a still image in which it can be distinguished whether the live image was displayed when the still image was captured.

Based on the transmission information added to the still image, it is possible to change a process for the still image. For example, a user may preferentially confirm a still image generated without performing the transmission of the live image. Furthermore, an image process to change image quality or composition correction may be performed on the still image generated without performing the transmission of the live image. Furthermore, when a still image is captured in the state in which the OVF or the EVF is mounted on the imaging apparatus 10, an image process corresponding to the type of the mounted display interface may be performed on the still image.

Furthermore, when a still image is captured without performing the transmission of the live image, capturing control for reducing failure in capturing may also be performed.

(Second Embodiment)

Figure 4:
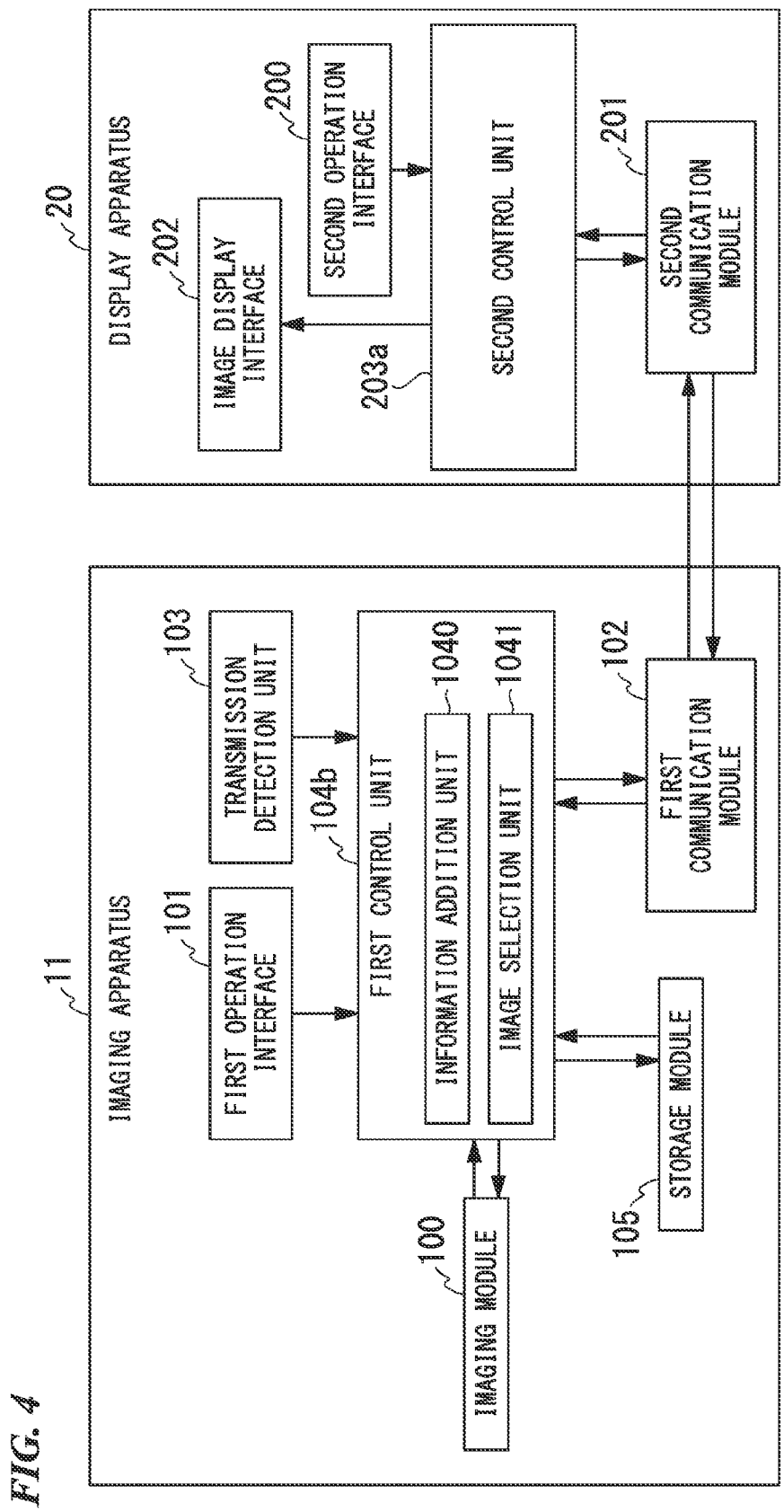
FIG. 4 is a block diagram showing a configuration example of an imaging system according to a second embodiment of the present invention.

Next, a second embodiment of the present invention will be described. FIG. 4 shows a configuration example of an imaging system according to the present embodiment. The imaging system showed in FIG. 4 includes an imaging apparatus 11 and the display apparatus 20. Since the configuration of the display apparatus 20 has been previously described, a description thereof will be omitted.

The imaging apparatus 11 includes the imaging module 100, the first operation interface 101, the first communication module 102, the transmission detection unit 103, a first control unit 104b, and the storage module 105. Description of previously described elements will be omitted.

In the present embodiment, the first control unit 104b includes the information addition unit 1040 and an image selection unit 1041. Since the information addition unit 1040 has been previously described, a description thereof will be omitted. The image selection unit 1041 selects a still image with the transmission information indicating that the transmission of the live image was not performed from the still images stored in the storage module 105. Furthermore, the first communication module 102 transmits the still image selected by the image selection unit 1041 to the display apparatus 20. The function of the first control unit 104*b* may be realized by software.

Figure 5:
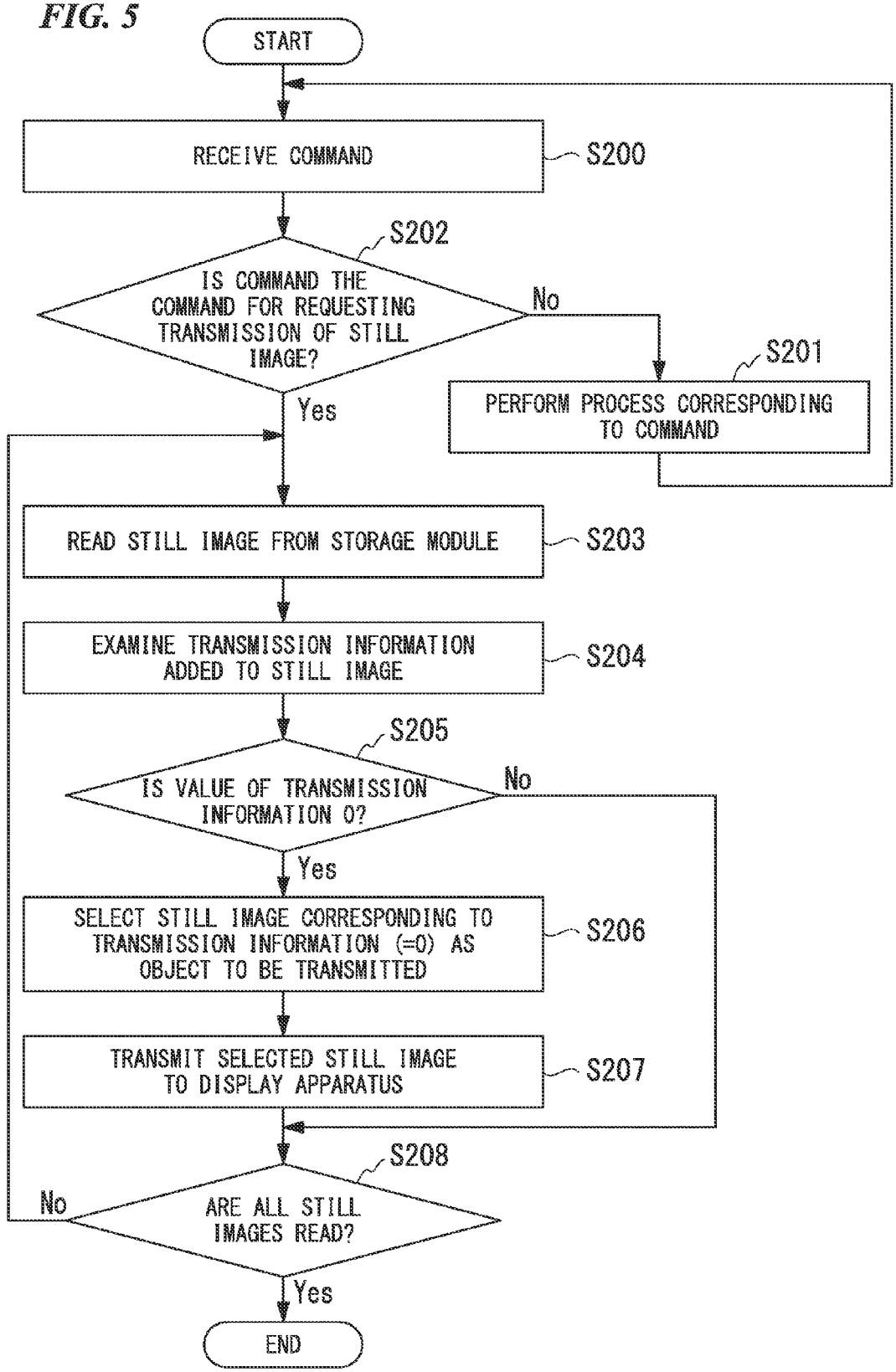
FIG. 5 is a flowchart showing an example of a procedure of an operation of an imaging apparatus according to a second embodiment of the present invention.

FIG. 5 shows an example of a procedure of the operation of the imaging apparatus 11. The operation of the imaging apparatus 11 will be described with reference to FIG. 5. The operation showed in FIG. 5 is performed after the operation showed in FIG. 3 is performed.

When the procedure is started, the imaging apparatus 11 waits for a command transmitted from the display apparatus 20. When the reception of the command is detected, the first control unit 104*b* allows the first communication module 102 to receive the command (step S200). In this way, the first communication module 102 receives the command from the display apparatus 20. The received command is output to the first control unit 104*b*.

After the command is received, the first control unit 104*b* determines whether the received command is a command for requesting the transmission of a still image (step S202). When it is determined that the received command is not the command for requesting the transmission of the still image, the first control unit 104*b* performs a process corresponding to the received command (step S201). After the process corresponding to the received command is performed, the imaging apparatus 11 waits for a command transmitted from the display apparatus 20. When it is determined that the received command is the command for requesting the transmission of the still image, the first control unit 104*b* reads any one of the still images stored in the storage module 105 (step S203).

The first control unit 104*b* examines transmission information added to the still image read from the storage module 105 in step S203 (step S204). The first control unit 104*b* determines whether a value of the transmission information examined in step S204 is 0 (step S205).

When it is determined that the value of the transmission information is 1, that is, when the transmission of the live image was performed when the still image was captured, a process of step S208 is performed. Furthermore, when it is determined that the value of the transmission information is 0, that is, when the transmission of the live image was not performed when the still image was captured, the image selection unit 1041 selects a still image corresponding to the transmission information having a value of 0 as an object to be transmitted (step S206). The selected still image is output to the first communication module 102.

After the still image to be transmitted is selected, the first control unit 104*b* allows the first communication module 102 to transmit the selected still image to the display apparatus 20 (step S207). In this way, the first communication module 102 transmits the selected still image to the display apparatus 20. The transmission of the still image may be performed by a background process of other processes performed in the imaging apparatus 11.

After the still image is transmitted, the first control unit 104*b* determines whether all the still images stored in the storage module 105 have been read (step S208). When it is determined that all the still images stored in the storage module 105 have been read, the procedure showed in FIG. 5 is ended. Furthermore, when it is determined that there are unread still images, the process of step S203 is performed.

When the still image and the transmission information are separate and correlated, only the transmission information may be read in step S203 and the still image correlated with the transmission information may be read in step S206.

When no commands are received from the display apparatus 20 and a transmission command of a still image is input via the first operation interface 101, the processes after step S203 may be performed. Accordingly, the processes of steps S200 to S202 are optional in the present embodiment.

In step S207, thumbnail images of the still image may be transmitted to the display apparatus 20. The thumbnail images are displayed on the display apparatus 20, so that a user can easily confirm whether it is possible to capture a desired object.

Only one still image with the transmission information indicating that the transmission of the live image is not being performed may be transmitted to the display apparatus 20. For example, after a list of thumbnail images of all the still images stored in the storage module 105 is displayed on the display apparatus 20, a user designates a thumbnail image. When transmission information added to a still image corresponding to the designated thumbnail image indicates that the transmission of the live image is not being performed, the still image with the transmission information is displayed on the display apparatus 20. Furthermore, only the thumbnail image of the one still image may also be transmitted to the display apparatus 20.

After a still image generated without performing the transmission of the live image is transmitted to the display apparatus 20, the imaging apparatus 11 may transmit a still image generated after the transmission of the live image is performed to the display apparatus 20. That is, the image selection unit 1041 may further select a still image with the transmission information indicating that the transmission of the live image was performed. Furthermore, the first communication module 102 may also transmit the still image with the transmission information indicating that the transmission of the live image was performed to the display apparatus 20 only after the transmission of the still image with the transmission information indicating that the transmission of the live image was not performed.

In the present embodiment, the still image generated without performing the transmission of the live image can be preferentially transmitted to the display apparatus 20. The display apparatus 20 displays the still image on the image display interface 202, so that a user can preferentially confirm composition and the like of the still image. Furthermore, it is possible to reduce effort of a user in selecting still images stored in the storage module 105 in order to confirm the composition and the like of the still image generated without performing the transmission of the live image.

(Third Embodiment)

Figure 6:
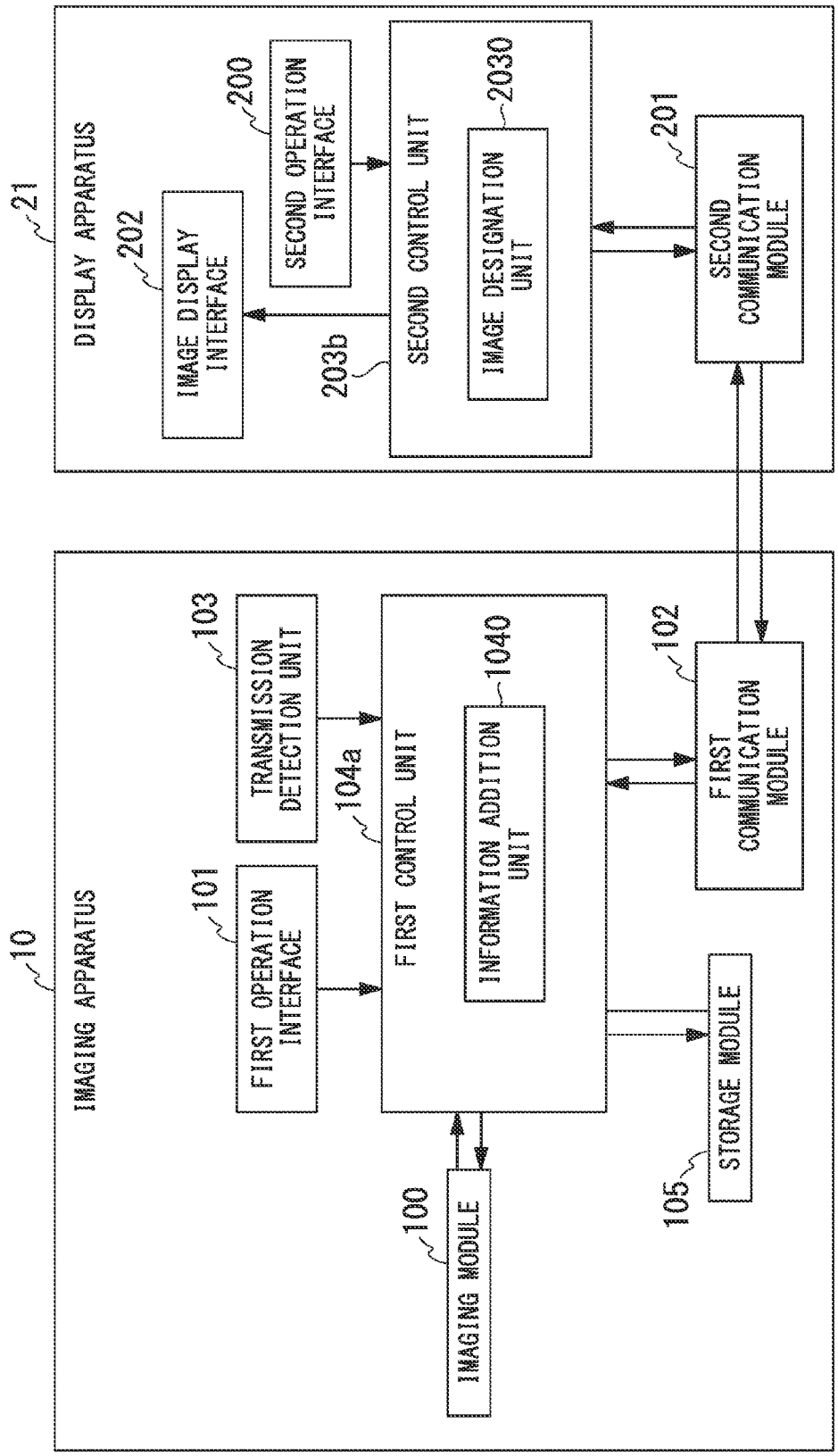
FIG. 6 is a block diagram showing a configuration example of an imaging system according to a third embodiment of the present invention.

Next, a third embodiment of the present invention will be described. FIG. 6 shows a configuration example of an imaging system according to the present embodiment. The imaging system showed in FIG. 6 includes the imaging apparatus 10 and a display apparatus 21. Since the configuration of the imaging apparatus 10 has been previously described, a description thereof will be omitted.

The display apparatus 21 includes the second operation interface 200, the second communication module 201, the image display interface 202, and a second control unit 203*b*. Description of previously described elements will be omitted.

In the present embodiment, the second control unit 203*b* includes an image designation unit 2030. The image designation unit 2030 generates designation information for designating a still image to be transmitted from identification information corresponding to the transmission information indicating that the transmission of the live image is not being performed. The identification information is information (for example, a file name of a still image) for identifying a still image with the transmission information. The first communication module 102 transmits the transmission information, the identification information, and the still image to be transmitted to the display apparatus 21, and receives the designation information from the display apparatus 21. The second communication module 201 receives the transmission information, the identification information, and the still image to be transmitted from the imaging apparatus 10, and transmits the designation information to the imaging apparatus 10. The function of the second control unit 203b may be realized by software.

Figure 7:
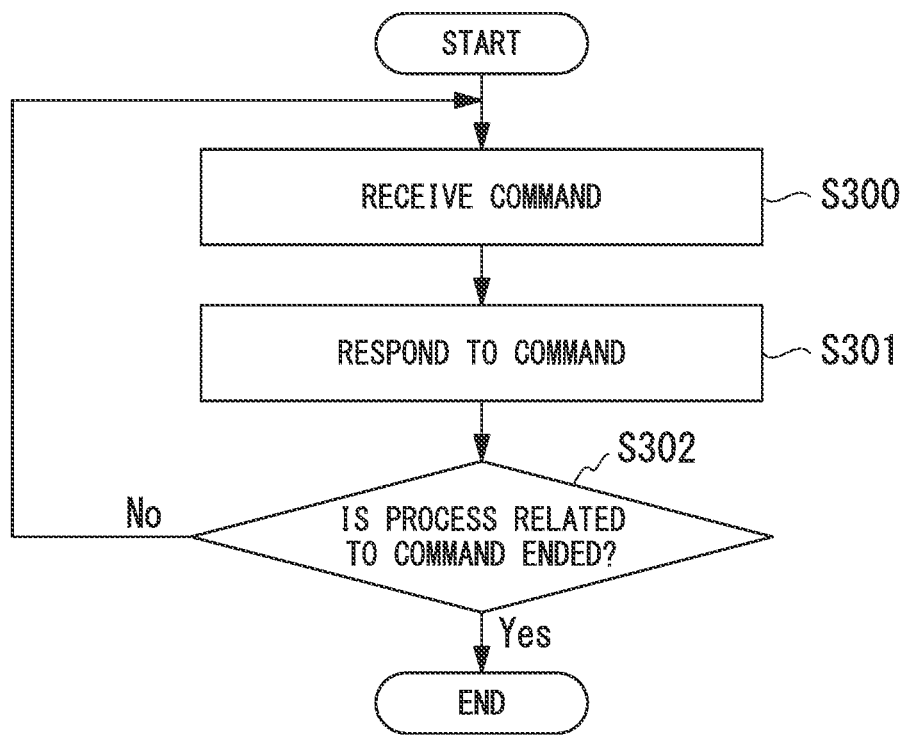
FIG. 7 is a flowchart showing an example of a procedure of an operation of an imaging apparatus according to a third embodiment of the present invention.

FIG. 7 shows an example of a procedure of the operation of the imaging apparatus 10. The operation of the imaging apparatus 10 will be described with reference to FIG. 7. The operation showed in FIG. 7 is performed after the operation showed in FIG. 3 is performed.

When the procedure is started, the imaging apparatus 10 waits for a command transmitted from the display apparatus 21. When the reception of the command is detected, the first control unit 104a allows the first communication module 102 to receive the command (step S300). In this way, the first communication module 102 receives the command from the display apparatus 21. The received command is output to the first control unit 104a.

After the command is received, the first control unit 104a allows the first communication module 102 to transmit a response for the command to the display apparatus 21 (step S301). In this way, the first communication module 102 transmits the response for the command to the display apparatus 21.

After the response for the command is transmitted, the first control unit 104a determines whether to end a process related to the command (step S302). For example, when a command notifying of the end of the process in step S300 is received, it is determined to end the process related to the command. Otherwise, it is determined not to end the process related to the command.

When it is determined to end the process related to the command, the procedure showed in FIG. 7 is ended. Furthermore, when it is determined not to end the process related to the command, the process of step S300 is performed.

Figure 8:
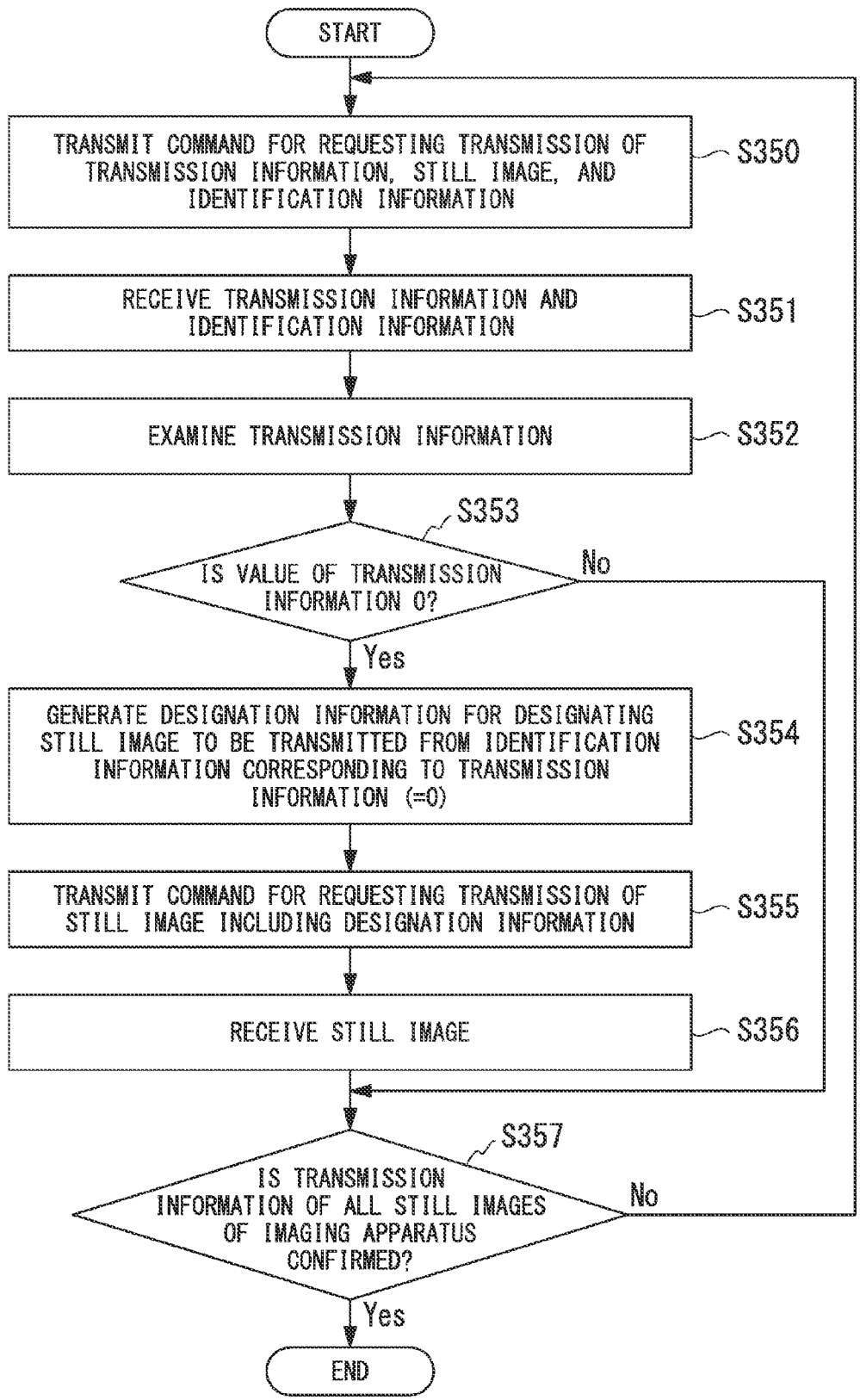
FIG. 8 is a flowchart showing an example of a procedure of an operation of a display apparatus according to a third embodiment of the present invention.

FIG. 8 shows an example of a procedure of the operation of the display apparatus 21. The operation of the display apparatus 21 will be described with reference to FIG. 8.

When the procedure is started, the second control unit 203b allows the second communication module 201 to transmit a command for requesting the transmission of the transmission information and the identification information of the still image to the imaging apparatus 10 (step S350). In this way, the second communication module 201 transmits the command for requesting the transmission of transmission information and the identification information of the still image to the imaging apparatus 10.

The command transmitted by the display apparatus 21 is received by the imaging apparatus 10 in step S300 of FIG. 7. In step S301, the first control unit 104a allows the first communication module 102 to transmit transmission information stored in the storage module 105 and identification information of a still image with the transmission information to the display apparatus 21. In this way, the first communication module 102 transmits the transmission information stored in the storage module 105 and the identification information of the still image with the transmission information to the display apparatus 21.

After the command is transmitted in step S350, the second control unit 203b allows the second communication module 201 to receive the transmission information and the identification information transmitted by the imaging apparatus 10 (step S351). In this way, the second communication module 201 receives the transmission information and the identification information transmitted by the imaging apparatus 10. The received transmission information and identification information are output to the second control unit 203b.

The transmission information and the identification information received by the display apparatus 21 are correlated with each other. For example, the transmission information and the identification information are transmitted to the display apparatus 21 by the same communication frame. The transmission information and the identification information may be stored in the same file. The identification information is included in a file separate from the file of the transmission information and information for referring to one of these files is included in the other file, so that the transmission information and the identification information may be correlated with each other.

After the transmission information and the identification information are received, the second control unit 203b examines the received transmission information (step S352). The second control unit 203b determines whether a value of the transmission information examined in step S352 is 0 (step S353). When it is determined that the value of the transmission information is 1, that is, when the transmission of the live image was performed when the still image was captured, a process of step S357 is performed. Furthermore, when it is determined that the value of the transmission information is 0, that is, when the transmission of the live image was not performed when the still image was captured, the image designation unit 2030 generates designation information for designating a still image with the transmission information having a value of 0 as an object to be transmitted from identification information corresponding to the transmission information (step S354). The identification information and the designation information may be the same. The generated designation information is output to the second communication module 201.

After the designation information is generated, the second control unit 203b allows the second communication module 201 to transmit a command for requesting the transmission of a still image including the generated designation information to the imaging apparatus 10 (step S355). In this way, the second communication module 201 transmits the command for requesting the still image including the generated designation information to the imaging apparatus 10.

The command transmitted by the display apparatus 21 is received by the imaging apparatus 10 in step S300 of FIG. 7. In step S301, the first control unit 104a allows the first communication module 102 to transmit a still image designated by the designation information included in the received command to the display apparatus 21. The still image is a still image stored in the storage module 105. In this way, the first communication module 102 transmits the still image designated by the designation information included in the received command to the display apparatus 21.

After the command is transmitted in step S355, the second control unit 203b allows the second communication module 201 to receive the still image transmitted by the imaging apparatus 10 (step S356). In this way, the second communication module 201 receives the still image transmitted by the imaging apparatus 10. The received still image is output to the second control unit 203b.

After the still image is received, the second control unit 203b determines whether the transmission information of all the still images of the imaging apparatus 10 has been confirmed (step S357). For example, whenever the imaging apparatus 10 receives the command for requesting the transmission of the transmission information and the identification information of the still image, the first control unit 104a determines whether the transmission information of all the still images has been transmitted. When the transmission information of all the still images has been transmitted, the first control unit 104a performs a process of transmitting a response indicating that the transmission information of all the still images has been confirmed to the display apparatus 21. When the response is received by the second communication module 201, it is determined that the transmission information of all the still images of the imaging apparatus 10 has been confirmed, and otherwise, it is determined that there is unconfirmed transmission information of the still images.

When it is determined that the transmission information of all the still images of the imaging apparatus 10 has been confirmed, the procedure showed in FIG. 8 is ended. Furthermore, when it is determined that there is the unconfirmed transmission information of the still images, the process of step S350 is performed.

The display apparatus 21 may not transmit the command for requesting the transmission of the transmission information and the identification information of the still image. For example, when the transmission command of the transmission information and the identification information of the still image is input via the first operation interface 101, the imaging apparatus 10 may also transmit the transmission information and the identification information of the still image to the display apparatus 21. Accordingly, the processes of step S350 are optional in the present embodiment.

Furthermore, after the still image is received in step S355, the image display interface 202 may display the received still image. Furthermore, in step S356, thumbnail images of the still image may be received.

Furthermore, in the procedure showed in FIG. 8, all the still images with the transmission information indicating that the transmission of the live image was not performed are transmitted to the display apparatus 21. However, only one still image (or only a thumbnail image of the one still image) with the transmission information indicating that the transmission of the live image was not performed may also be transmitted to the display apparatus 21. For example, the procedure showed in FIG. 8 may also be ended without performing the process of step S357. The display apparatus 21 repeatedly performs the processes other than the process of step S357 from all the processes of the procedure showed in FIG. 8, so that the display apparatus 21 may receive all the still images with the transmission information indicating that the transmission of the live image was not performed.

After the still image generated without performing the transmission of the live image is received by the display apparatus 21, the still image generated after the transmission of the live image may also be received by the display apparatus 21. That is, the image designation unit 2030 may generate the designation information from the identification information corresponding to the transmission information indicating that the transmission of the live image was performed, and the second communication module 201 may also receive the still image with the transmission information indicating that the transmission of the live image was performed from the imaging apparatus 10 only after the still image with the transmission information indicating that the transmission of the live image was not performed is received.

In the present embodiment, the still image generated without performing the transmission of the live image can be preferentially transmitted to the display apparatus 21. The display apparatus 21 displays the still image on the image display interface 202, so that a user can preferentially confirm composition and the like of the still image. Furthermore, it is possible to reduce effort of a user in selecting still images stored in the storage module 105 in order to confirm the composition and the like of the still image generated without performing the transmission of the live image.

(Fourth Embodiment)

Figure 9:
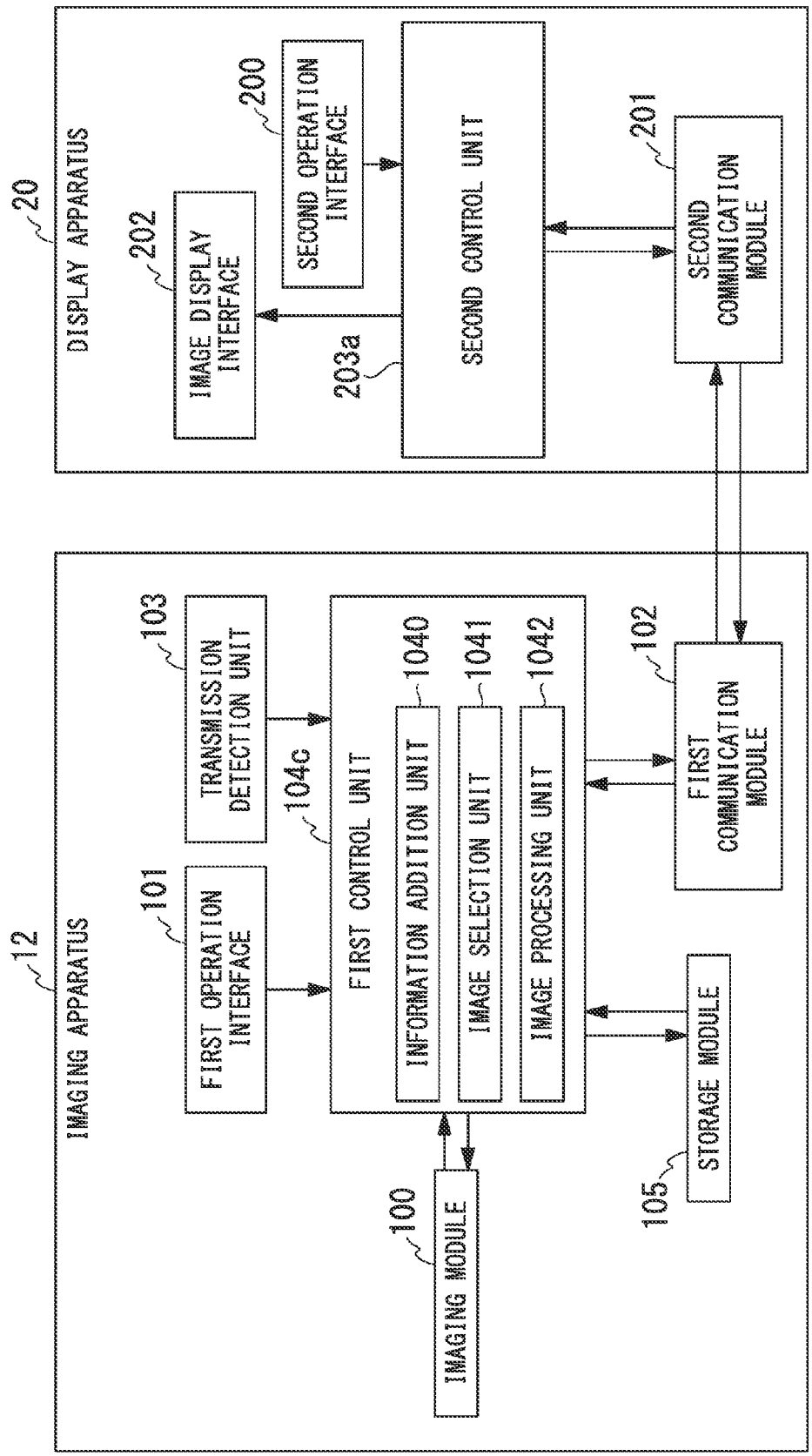
FIG. 9 is a block diagram showing a configuration example of an imaging system according to a fourth embodiment of the present invention.

Next, a fourth embodiment of the present invention will be described. FIG. 9 shows a configuration example of an imaging system according to the present embodiment. The imaging system showed in FIG. 9 includes an imaging apparatus 12 and the display apparatus 20. Since the configuration of the display apparatus 20 has been previously described, a description thereof will be omitted.

The imaging apparatus 12 includes the imaging module 100, the first operation interface 101, the first communication module 102, the transmission detection unit 103, a first control unit 104c, and the storage module 105. Description of previously described elements will be omitted.

In the present embodiment, the first control unit 104c includes the information addition unit 1040, the image selection unit 1041, and an image processing unit 1042. Since the information addition unit 1040 and the image selection unit 1041 have been previously described, a description thereof will be omitted. The image processing unit 1042 performs an image process on the still image selected by the image selection unit 1041. The first communication module 102 transmits the still image processed by the image processing unit 1042 to the display apparatus 20. The function of the first control unit 104c may be realized by software.

For example, the image process performed by the image processing unit 1042 is a process of causing the still image selected by the image selection unit 1041 to resemble an image captured by a film camera. For example, the image processing unit 1042 performs a process of adding granular noise to the still image selected by the image selection unit 1041. Alternatively, the image processing unit 1042 may perform a process of emphasizing a color, a process of blurring a color, a process of converting the still image to two-tone black-and-white image, a process of darkening the periphery of an image, and a process of emphasizing contrast, and the like with respect to the still image selected by the image selection unit 1041.

Alternatively, the image processing unit 1042 may also perform a process of adding a frame or a capturing date to the still image selected by the image selection unit 1041. Alternatively, image processing parameters corresponding to the various aforementioned image processes may be stored in the storage module 105, and the image processing unit 1042 may randomly select the image processing parameters stored in the storage module 105 and may perform image processes based on the selected image processing parameters on the still image selected by the image selection unit 1041.

Figure 10:
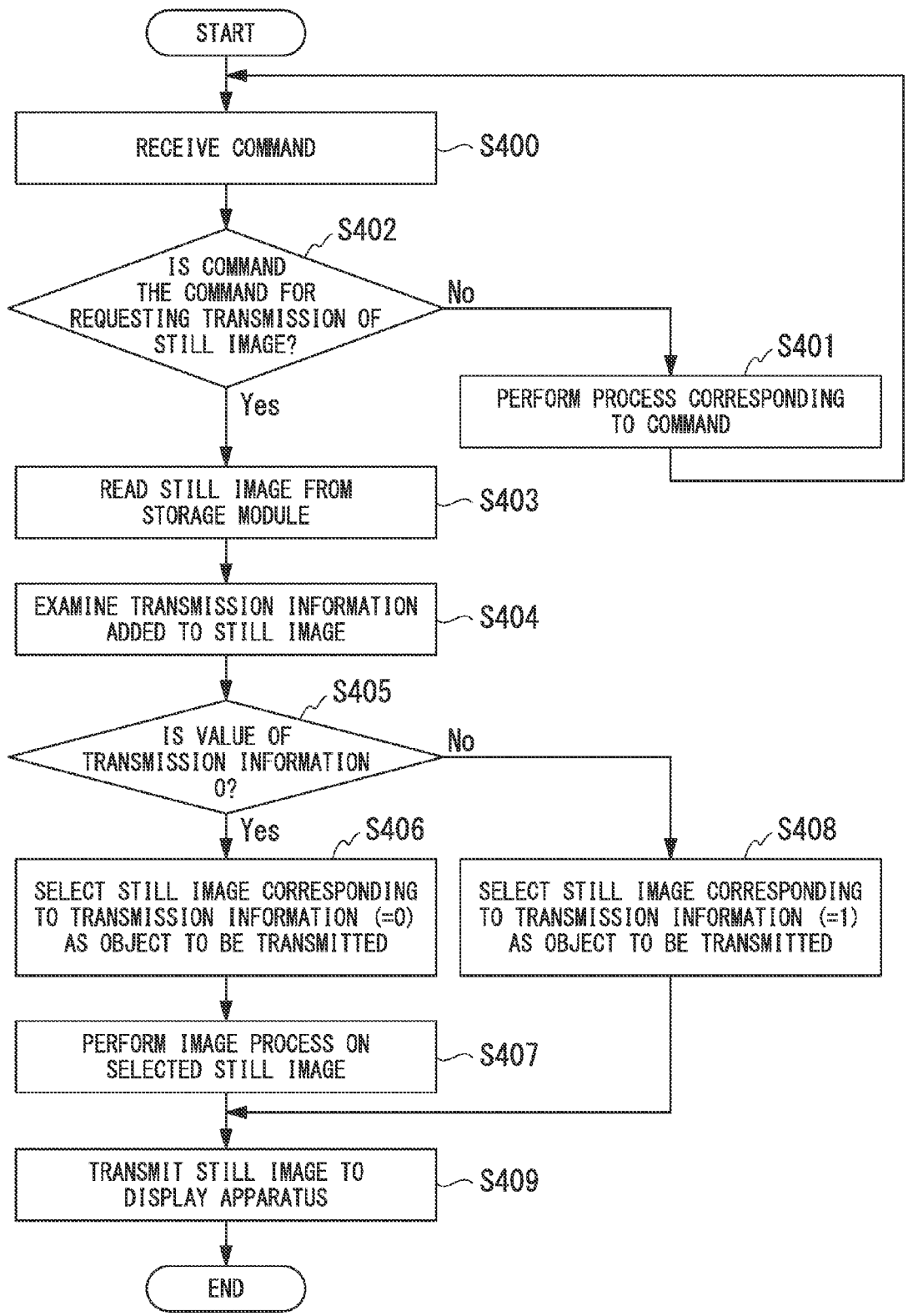
FIG. 10 is a flowchart showing an example of a procedure of an operation of an imaging apparatus according to a fourth embodiment of the present invention.

FIG. 10 shows an example of a procedure of the operation of the imaging apparatus 12. The operation of the imaging apparatus 12 will be described with reference to FIG. 10. The operation showed in FIG. 10 is performed after the operation showed in FIG. 3 is performed.

Since processes of steps S400 to S406 are similar to those of steps S200 to S206 of FIG. 5, a description thereof will be omitted. After the still image is selected in step S406, the image processing unit 1042 performs an image process on the still image selected by the image selection unit 1041 (step S407).

After the image process is performed, the first control unit 104*c* allows the first communication module 102 to transmit the still image subjected to the image process to the display apparatus 20 (step S409). In this way, the first communication module 102 transmits the still image subjected to the image process to the display apparatus 20. After the still image is transmitted, the procedure showed in FIG. 10 is ended.

When it is determined that the value of the transmission information is 1 in step S405, that is, when the transmission of the live image was performed when the still image was captured, the image selection unit 1041 selects a still image corresponding to the transmission information having a value of 1 as an object to be transmitted (step S408). The selected still image is output to the first communication module 102 and is transmitted to the display apparatus 20 by the first communication module 102 in step S409.

After the process of step S409 is performed, a process similar to the process of step S208 of FIG. 5 may be performed, and the transmission of the still image may be repeated.

When no command is received from the display apparatus 20 and the transmission command of the still image is input via the first operation interface 101, the processes after step S403 may be performed. Accordingly, the processes of steps S400 to S402 are optional in the present embodiment.

Furthermore, the process of step S408 may not be performed. That is, the still image generated after the transmission of the live image is performed may not be transmitted to the display apparatus 20. Accordingly, the process of step S408 is optional in the present embodiment.

In the present embodiment, the still image generated without performing the transmission of the live image can be distinguished from the still image generated after the transmission of the live image is performed, and then the image process can be performed. In this way, for example, it is possible to generate a still image resembling an image captured by a film camera.

(Fifth Embodiment)

Figure 11:
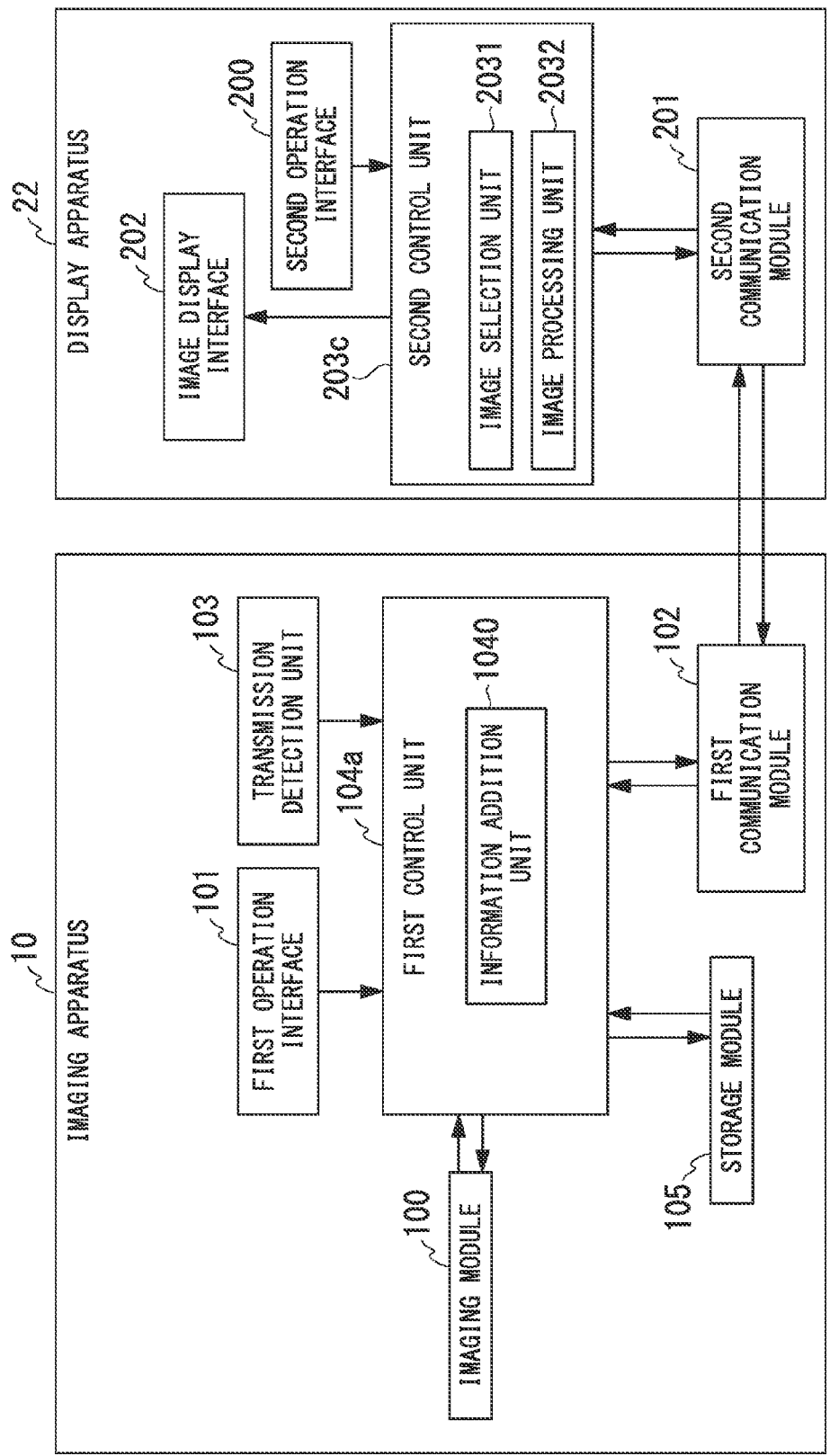
FIG. 11 is a block diagram showing a configuration example of an imaging system according to a fifth embodiment of the present invention.

Next, a fifth embodiment of the present invention will be described. FIG. 11 shows a configuration example of an imaging system according to the present embodiment. The imaging system showed in FIG. 11 includes the imaging apparatus 10 and a display apparatus 22. Since the configuration of the imaging apparatus 10 has been previously described, a description thereof will be omitted.

The display apparatus 22 includes the second operation interface 200, the second communication module 201, the image display interface 202, and a second control unit 203*c*. Description of previously described elements will be omitted.

In the present embodiment, the second control unit 203*c* includes an image selection unit 2031 and an image processing unit 2032. The image selection unit 2031 selects a still image with the transmission information indicating that the transmission of the live image was not performed from the still images received by the second communication module 201. The image processing unit 2032 performs an image process on the still image selected by the image selection unit 2031. The image process performed by the image processing unit 2032 is similar to that performed by the image processing unit 1042 in the fourth embodiment. The first communication module 102 transmits the still image and the transmission information stored in the storage module 105 to the display apparatus 22. The second communication module 201 receives the still image and the transmission information from the imaging apparatus 10. The function of the second control unit 203*c* may be realized by software.

Figure 12:
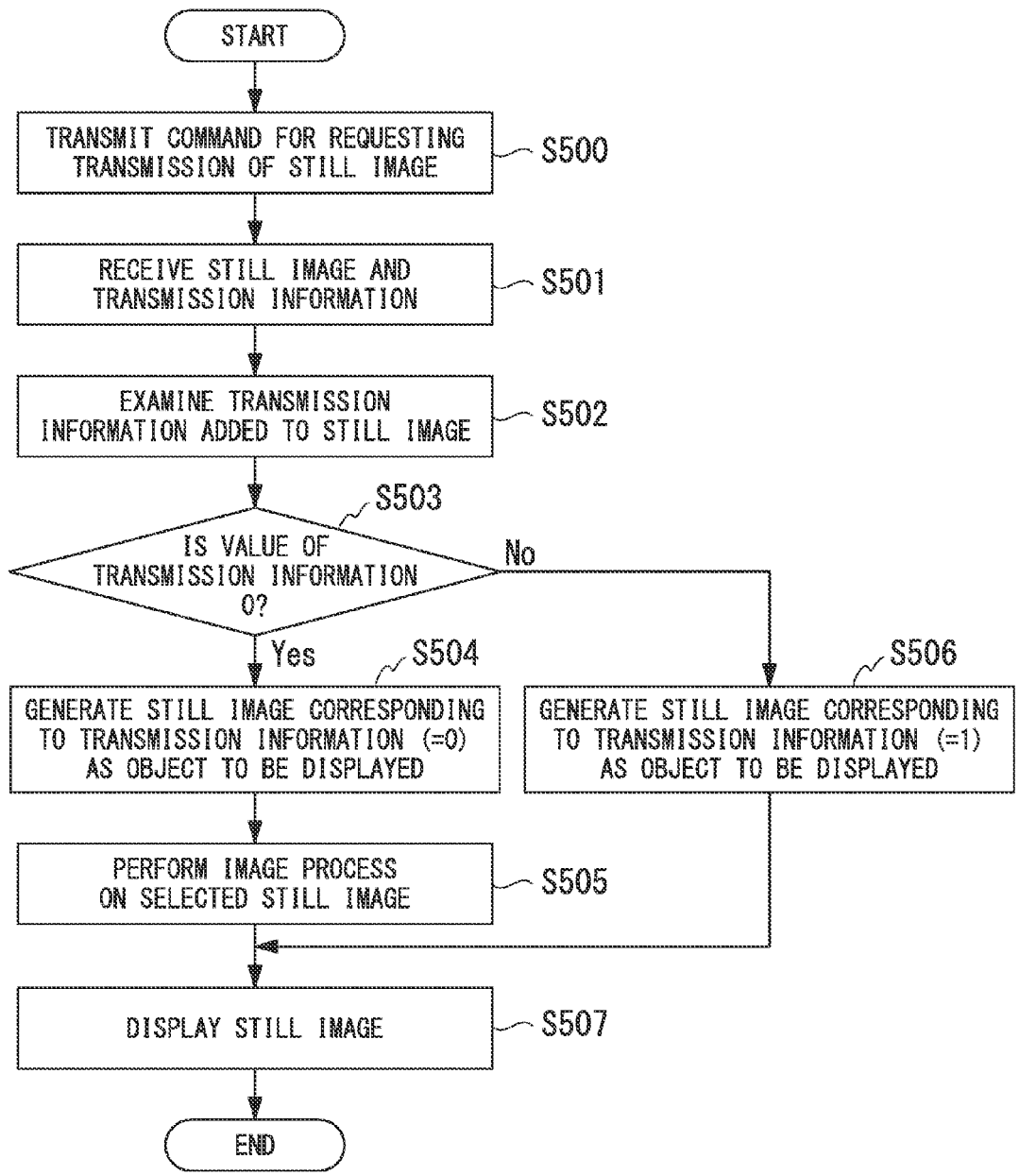
FIG. 12 is a flowchart showing an example of a procedure of an operation of a display apparatus according to a fifth embodiment of the present invention.

FIG. 12 shows an example of a procedure of the operation of the display apparatus 22. The operation of the display apparatus 22 will be described with reference to FIG. 12.

When the procedure is started, the second control unit 203*c* allows the second communication module 201 to transmit a command for requesting the transmission of a still image to the imaging apparatus 10 (step S500). In this way, the second communication module 201 transmits the command for requesting the transmission of a still image to the imaging apparatus 10.

The command transmitted by the display apparatus 22 is received by the imaging apparatus 10 in step S300 of FIG. 7. In step S301, the first control unit 104*a* allows the first communication module 102 to transmit any one of the still images stored in the storage module 105 to the display apparatus 22. In this way, the first communication module 102 transmits any one of the still images stored in the storage module 105 to the display apparatus 22.

When the transmission information is embedded in the still image, the transmission information is transmitted by transmitting the still image. When the still image and the transmission information are separate and correlated, the imaging apparatus 10 may simultaneously transmit the still image and the transmission information, or the imaging apparatus 10 may sequentially transmit the still image and the transmission information.

After the command is transmitted in step S500, the second control unit 203*c* allows the second communication module 201 to receive the still image and the transmission information transmitted by the imaging apparatus 10 (step S501). In this way, the second communication module 201 receives the still image and the transmission information transmitted by the imaging apparatus 10. The received still image and transmission information are output to the second control unit 203*c*.

When the still image and the transmission information are received, the second control unit 203*c* examines the transmission information added to the received still image (step S502). The second control unit 203*c* determines whether a value of the transmission information examined in step S502 is 0 (step S503). When it is determined that the value of the transmission information is 0, that is, when the transmission of the live image was not performed when the still image was captured, the image selection unit 2031 selects a still image corresponding to the transmission information having a value of 0 as an object to be displayed (step S504).

After the still image is selected, the image processing unit 2032 performs an image process on the still image selected by the image selection unit 2031 (step S505). After the image process is performed, the second control unit 203*c* allows the image display interface 202 to display the still image subjected to the image process (step S507). In this way, the image display interface 202 displays the still image subjected to the image process. After the still image is displayed, the procedure showed in FIG. 12 is ended.

Furthermore, when it is determined that the value of the transmission information is 1, that is, when the transmission of the live image was performed when the still image was captured, the image selection unit 2031 selects a still image corresponding to the transmission information having a value of 1 as an object to be displayed (step S506). The selected still image is output to the image display interface 202 and is displayed by the image display interface 202 in step S507.

After the process of step S506 is performed, a process similar to the process of step S357 of FIG. 8 may be performed, and the reception of the still image and the transmission information may be repeated.

The display apparatus 22 may not transmit the command for requesting the transmission of a still image. For example, when the transmission command of the still image is input via the first operation interface 101, the imaging apparatus 10 may transmit the still image and the transmission information to the display apparatus 22. Accordingly, the process of step S500 is optional in the present embodiment.

Furthermore, the process of step S507 may not be performed. That is, the image display interface 202 may not display the still image. Accordingly, the process of step S507 is optional in the present embodiment.

In the present embodiment, the still image generated without performing the transmission of the live image can be distinguished from the still image generated after the transmission of the live image is performed, and then the image process can be performed. In this way, for example, it is possible to generate a still image resembling an image captured by a film camera. Furthermore, the display apparatus 22 performs the image process, so that it is possible to perform a more complex image process using the second control unit 203c of the display apparatus 22 than in the fourth embodiment in which the imaging apparatus 12 performs the image process.

(Sixth Embodiment)

Figure 13:
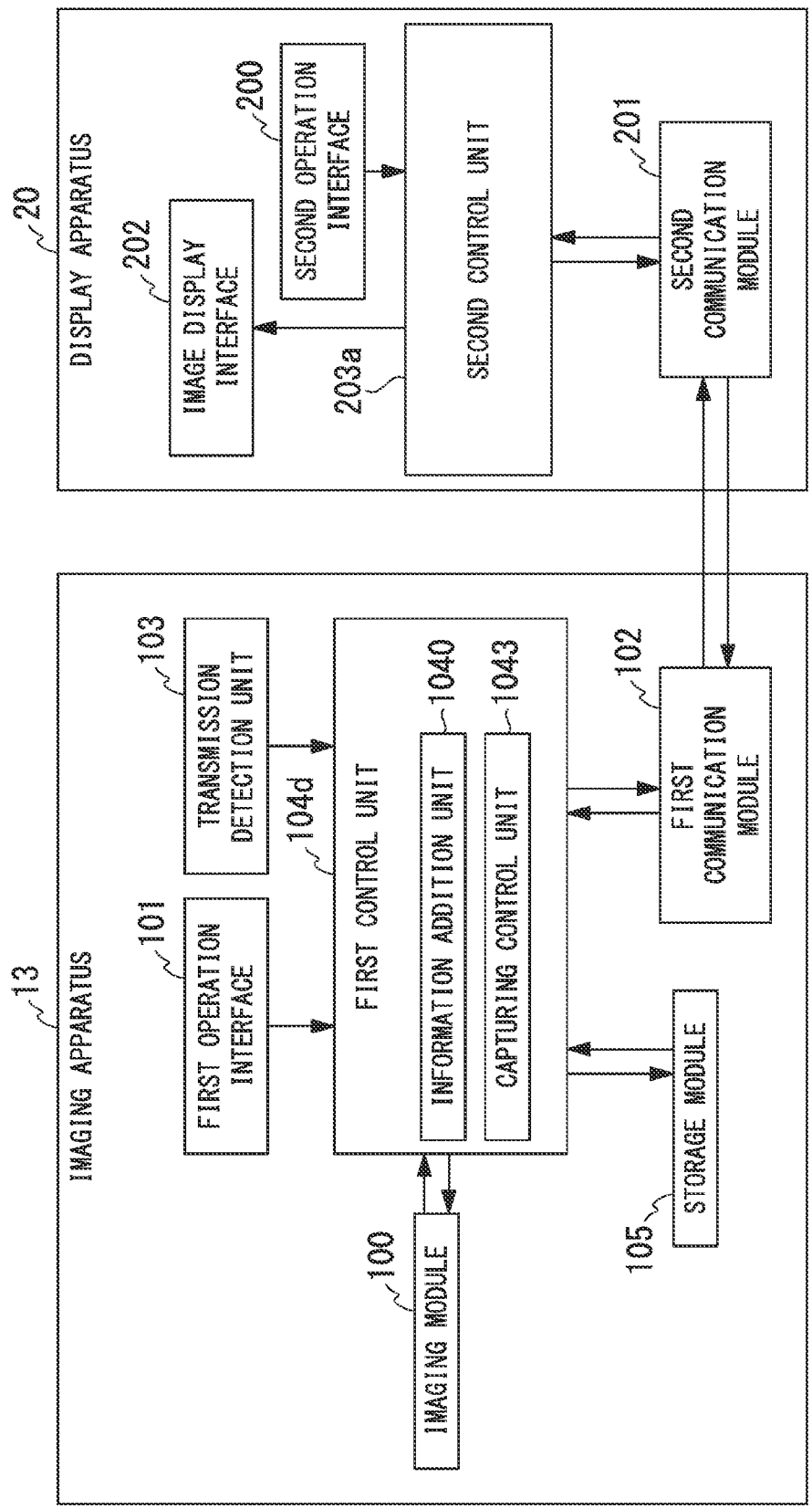
FIG. 13 is a block diagram showing a configuration example of an imaging system according to a sixth embodiment of the present invention.

Next, a sixth embodiment of the present invention will be described. FIG. 13 shows a configuration example of an imaging system according to the present embodiment. The imaging system showed in FIG. 13 includes an imaging apparatus 13 and the display apparatus 20. Since the configuration of the display apparatus 20 has been previously described, a description thereof will be omitted.

The imaging apparatus 13 includes the imaging module 100, the first operation interface 101, the first communication module 102, the transmission detection unit 103, a first control unit 104d, and the storage module 105. Description of previously described elements will be omitted.

In the present embodiment, the first control unit 104d includes the information addition unit 1040 and a capture control unit 1043. Since the information addition unit 1040 has been previously described, a description thereof will be omitted. The capture control unit 1043 controls imaging parameters of the imaging module 100 when the transmission of the live image is not being performed before the first capturing command is input via the first operation interface 101 or when the second capturing command is received by the first communication module 102. The imaging parameters of the imaging module 100 are parameters for regulating the operation of the imaging module 100. The function of the first control unit 104d may be realized by software.

When the transmission of the live image is not being performed, the live image is not displayed in the display apparatus 20. When a still image is captured in the state in which confirmation of composition and the like based on the live image is not being performed, it is highly probable that capturing will fail (a still image different from a still image desired by a user will be captured). In order to suppress failure of capturing when the transmission of the live image is not being performed, the imaging parameters of the imaging module 100 at the time of the capturing are automatically set as parameters decided in advance. The imaging parameters of the imaging module 100 set by the capture control unit 1043 may be stored in the storage module 105 in advance. The capture control unit 1043 controls the imaging module 100 according to the set imaging parameters, thereby allowing the imaging module 100 to generate still images.

For example, the capture control unit 1043 sets a capturing mode to a full automatic mode and automatically sets a parameter of a shutter speed and a diaphragm in response to a scene being captured. Alternatively, the capture control unit 1043 sets a focus control parameter based on a focus state in the center of a capturing area of the imaging module 100 such that focus control is performed. Alternatively, the capture control unit 1043 sets an exposure control parameter based on an exposure state in the center of the capturing area of the imaging module 100 such that exposure control is performed.

Alternatively, when a shutter button serving as the first operation interface 101 has been pressed halfway, the capture control unit 1043 starts the focus control based on the focus state in the center of the capturing area of the imaging module 100, tracks an object position using the center of the capturing area of the imaging module 100 as a start point, and sets the focus control parameter based on the object position such that the focus control is performed.

Alternatively, when the shutter button serving as the first operation interface 101 has been pressed halfway, the capture control unit 1043 starts the exposure control based on the exposure state in the center of the capturing area of the imaging module 100. Subsequently, the capture control unit 1043 tracks an object position by employing the center of the capturing area of the imaging module 100 as a start point, and sets the exposure control parameter based on the object position such that the exposure control is performed.

The aforementioned control and control to be described below may be combined with each other. For example, the capture control unit 1043 may set a format, a compression rate (a file size), and a recording image size (the number of pixels) when a still image is stored in the storage module 105. For example, the capture control unit 1043 may allow the storage module 105 to store a RAW image, which is a format of an image output from the imaging module 100, and a compressed image (a JPEG image and the like) obtained by performing a compression process on the RAW image. When these images are stored in the storage module 105, the transmission information generated by the information addition unit 1040 is added to at least one of these images.

Alternatively, the capture control unit 1043 may also set state parameters of the imaging apparatus 13 or the display apparatus 20 such that a shutter sound is output from the imaging apparatus 13 or the display apparatus 20 when a still image is captured. When the capture control unit 1043 sets the state parameters of the display apparatus 20, the first communication module 102 transmits the state parameters to the display apparatus 20, the second communication module 201 of the display apparatus 20 receives the state parameters, and the second control unit 203a controls the state of the display apparatus 20 in response to the received state parameters. For example, when the transmission of the live image is not performed, the imaging apparatus 13 outputs the shutter sound according to the state parameters of the imaging apparatus 13. Furthermore, when the transmission of the live image is performed, the display apparatus 20 outputs the shutter sound according to the state parameters of the display apparatus 20.

Alternatively, the capture control unit 1043 may also set the state parameters of the imaging apparatus 13 or the display apparatus 20 such that the imaging apparatus 13 or the display apparatus 20 allows a light emitting element such as an LED to emit light when a still image is captured. For example, when the transmission of the live image is not performed, the light emitting element of the imaging apparatus 13 emits light according to the state parameters of the imaging apparatus 13. Furthermore, when the transmission of the live image is performed, the light emitting element of the display apparatus 20 emits light according to the state parameters of the display apparatus 20.

Figure 14:
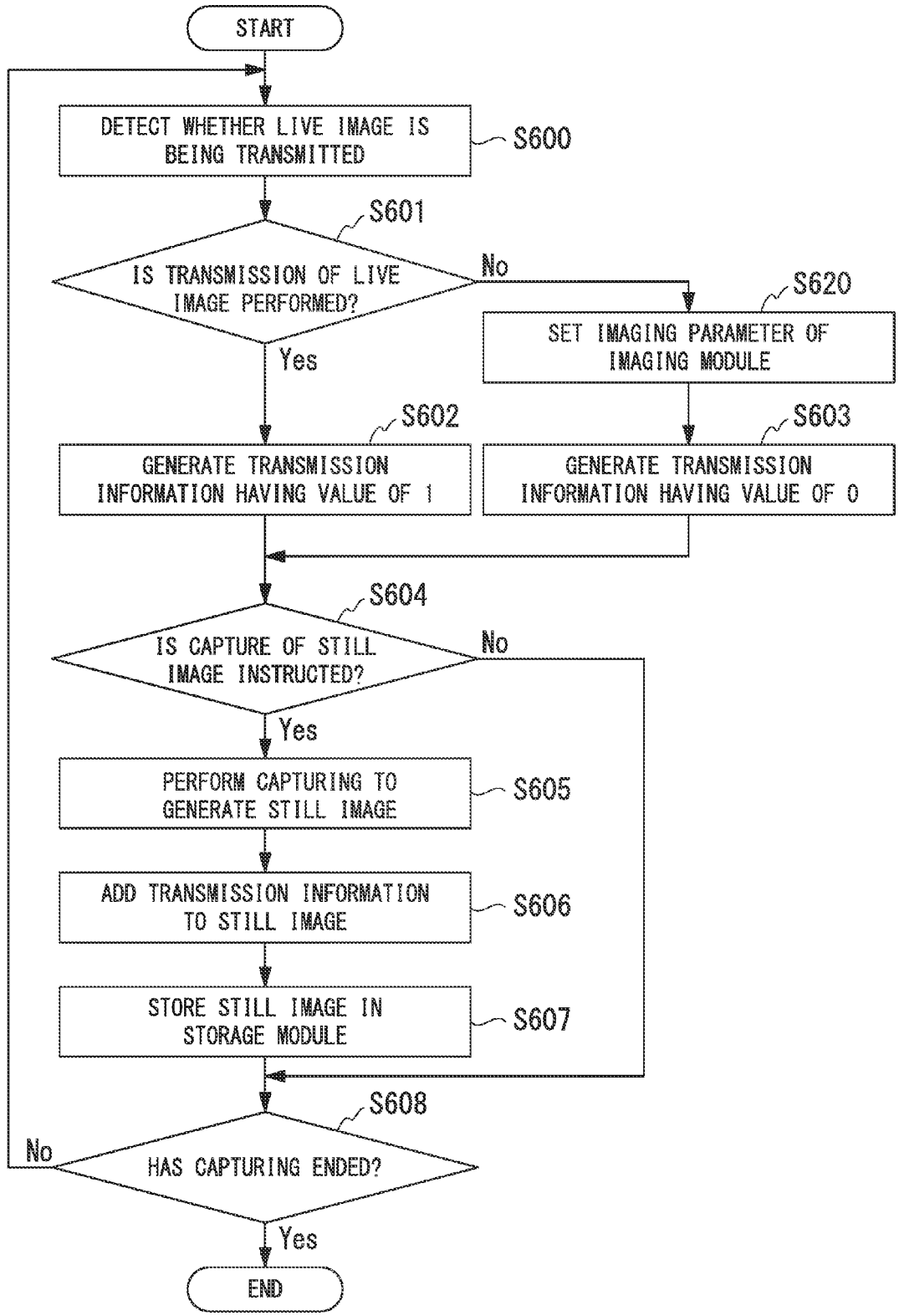
FIG. 14 is a flowchart showing an example of a procedure of an operation of an imaging apparatus according to a sixth embodiment of the present invention.

FIG. 14 shows an example of a procedure of the operation of the imaging apparatus 13. The operation of the imaging apparatus 13 will be described with reference to FIG. 14. FIG. 14 does not show the generation and transmission of the live image.

Since processes of steps S600 to S408 are similar to those of steps S100 to S108 of FIG. 3, a description thereof will be omitted. When it is determined that the transmission of the live image is not being performed in step S601, the capture control unit 1043 sets the imaging parameters of the imaging module 100 (step S620). After the imaging parameters are set, a process of step S603 is performed.

The process of step S620 may be performed after the process of step S603 is performed. Furthermore, after a process of step S607 is performed, the capturing may be forcibly ended without performing the determination of step S608.

In the present embodiment, when the capture of a still image is performed without performing the transmission of the live image, since the imaging parameters of the imaging module 100 are automatically set, it is possible to suppress the failure of the capturing (capture of a still image different from a still image desired by a user).

(Seventh Embodiment)

Figure 15:
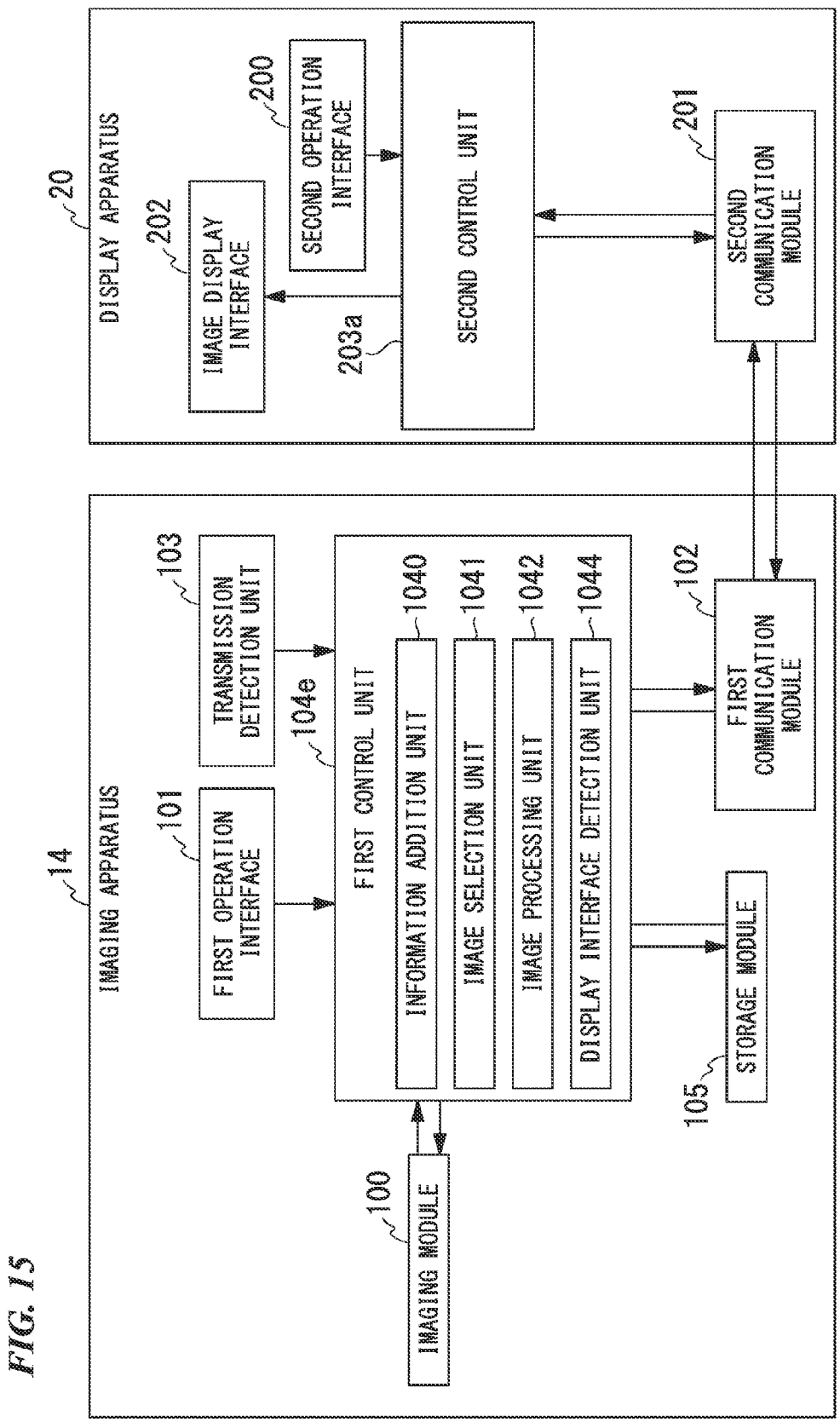
FIG. 15 is a block diagram showing a configuration example of an imaging system according to a seventh embodiment of the present invention.

Next, a seventh embodiment of the present invention will be described. FIG. 15 shows a configuration example of an imaging system according to the present embodiment. The imaging system showed in FIG. 15 includes an imaging apparatus 14 and the display apparatus 20. Since the configuration of the display apparatus 20 has been previously described, a description thereof will be omitted.

The imaging apparatus 14 includes the imaging module 100, the first operation interface 101, the first communication module 102, the transmission detection unit 103, a first control unit 104e, and the storage module 105. Description of previously described elements will be omitted.

In the present embodiment, the first control unit 104e includes the information addition unit 1040, an image selection unit 1041, an image processing unit 1042, and a display interface detection unit (a display IF detection unit) 1044. The display interface detection unit 1044 detects whether a display interface (an OVF or an EVF) is mounted on the imaging apparatus 14. The display interface is detachable from the imaging apparatus 14, and displays an optical image of an object or a live image. The detection regarding whether the OVF or the EVF is mounted on the imaging apparatus 14 may be performed by mechanical detection or electrical detection. The information addition unit 1040 adds mounting information to the still image generated based on the first capturing command or the second capturing command before the first capturing command is input via the first operation interface 101 or the second capturing command is received by the first communication module 102. The mounting information indicates whether the display interface is mounted on the imaging apparatus 14. The storage module 105 stores still images with the transmission information and the mounting information. A method in which the information addition unit 1040 adds the mounting information to the still image is similar to a method in which the information addition unit 1040 adds the transmission information to the still image.

Furthermore, in the present embodiment, the image selection unit 1041 selects a still image with the transmission information indicating that the transmission of the live image is not being performed and the mounting information indicating that the display interface is mounted on the imaging apparatus 14 from the still images stored in the storage module 105. The image processing unit 1042 performs an image process on the still image selected by the image selection unit 1041. The first communication module 102 transmits the still image processed by the image processing unit 1042 to the display apparatus 20.

Furthermore, in the present embodiment, when it is detected that the display interface is mounted on the imaging apparatus 14, the display interface detection unit 1044 identifies the type of the display interface. The information addition unit 1040 indicates whether the display interface is mounted on the imaging apparatus 14 before the first capturing command is input via the first operation interface 101 or the second capturing command is received by the first communication module 102 by using the mounting information. Furthermore, when the display interface is mounted on the imaging apparatus 14, the information addition unit 1040 adds the mounting information indicating the type of the display interface to the still image generated based on the first capturing command or the second capturing command. The image processing unit 1042 performs an image process corresponding to the type of the display interface indicated by the mounting information on the still image selected by the image selection unit 1041. The function of the first control unit 104e may be performed by software.

For example, when the OVF is mounted on the imaging apparatus 14 and the EVF is mounted on the imaging apparatus 14, different signals are output from the OVF or the EVF. The display interface detection unit 1044 identifies the type of the display interface based on the signals output from the OVF or the EVF. For example, when resistive elements having different resistance values are mounted on the OVF and the EVF, the display interface detection unit 1044 detects currents output from the resistive elements when the same voltage is applied to the resistive elements, thereby identifying the type of the display interface.

Alternatively, in the imaging apparatus 14, a switch exclusively pressed in response to the type of the display interface is provided at a part abutting the display interface. The display interface detection unit 1044 may also identify the type of the display interface based on the state of the switch. For example, when a first switch for the OVF and a second switch for the EVF are provided on the surface of the imaging apparatus 14, only the first switch is pressed when the OVF is mounted on the imaging apparatus 14, and only the second switch is pressed when the EVF is mounted on the imaging apparatus 14.

Figure 16:
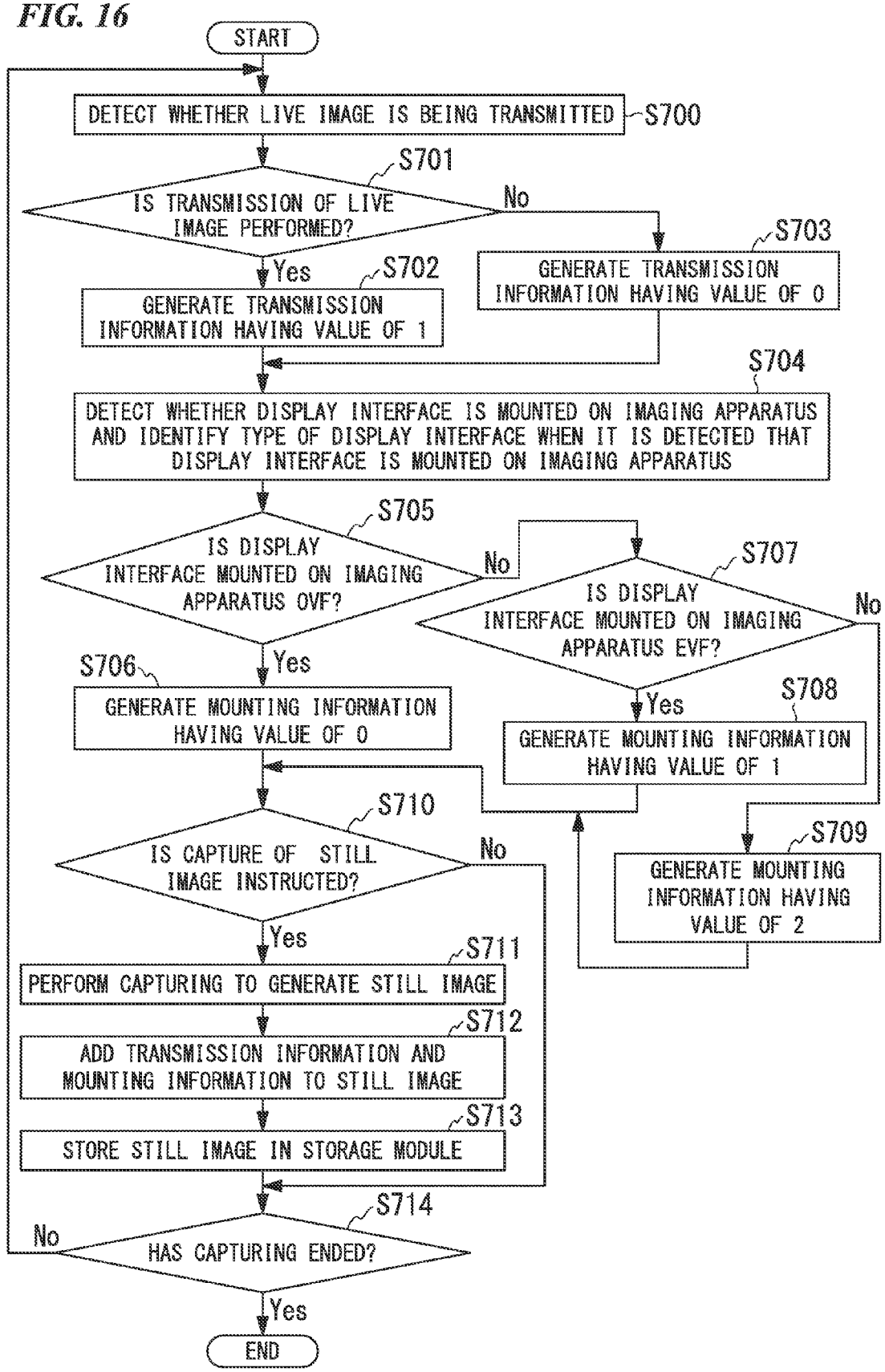
FIG. 16 is a flowchart showing an example of a procedure of an operation of an imaging apparatus according to a seventh embodiment of the present invention.

FIG. 16 shows an example of a procedure of the operation of the imaging apparatus 14. The operation of the imaging apparatus 14 will be described with reference to FIG. 16. FIG. 16 does not show the generation and transmission of the live image.

Since processes of steps S700 to S703 are similar to those of steps S100 to S103 of FIG. 3, a description thereof will be omitted. After the transmission information is generated in step S702 or step S703, the display interface detection unit 1044 detects whether a display interface is mounted on the imaging apparatus 14. When it is detected that the display interface is mounted on the imaging apparatus 14, the display interface detection unit 1044 identifies the type of the display interface (S704).

After the detection of the display interface is performed, the first control unit 104e determines whether the display interface mounted on the imaging apparatus 14 is the OVF based on the detection result of the display interface detection unit 1044 (S705). When it is detected that the display interface is mounted on the imaging apparatus 14 and it is identified that the type of the display interface is an OVF, it is determined that the display interface mounted on the imaging apparatus 14 is the OVF. Otherwise, it is determined that the display interface mounted on the imaging apparatus 14 is not the OVF.

When it is determined that the display interface mounted on the imaging apparatus 14 is the OVF, the information addition unit 1040 generates mounting information having a value of 0 (S706). Furthermore, when it is determined that the display interface mounted on the imaging apparatus 14 is not the OVF, the first control unit 104*e* determines whether the display interface mounted on the imaging apparatus 14 is an EVF based on the detection result of the display interface detection unit 1044 (S707). When it is detected that the display interface is mounted on the imaging apparatus 14 and it is identified that the type of the display interface is the EVF, it is determined that the display interface mounted on the imaging apparatus 14 is the EVF. Otherwise, it is determined that the display interface mounted on the imaging apparatus 14 is not the EVF. When it is determined that the display interface mounted on the imaging apparatus 14 is not the EVF, it represents that no display interface is mounted on the imaging apparatus 14 or an unknown display interface other than the OVF and the EVF is mounted on the imaging apparatus 14.

When it is determined that the display interface mounted on the imaging apparatus 14 is the EVF, the information addition unit 1040 generates mounting information having a value of 1 (S708). Furthermore, when it is determined that the display interface mounted on the imaging apparatus 14 is not the EVF, that is, when no display interface is mounted on the imaging apparatus 14, the information addition unit 1040 generates mounting information having a value of 2 (S709).

The mounting information having a value of 0 indicates that the display interface is mounted on the imaging apparatus 14 and the mounted display interface is the OVF. Furthermore, the mounting information having a value of 1 indicates that the display interface is mounted on the imaging apparatus 14 and the mounted display interface is the EVF. Furthermore, the mounting information having a value of 2 indicates that no display interface is mounted on the imaging apparatus 14 or an unknown display interface other than the OVF and the EVF is mounted on the imaging apparatus 14. It is sufficient if the value of the mounting information is a value capable of distinguishing the presence or absence of the display interface and the type of the display interface, and may be values other than 0, 1, and 2.

After the mounting information is generated, the first control unit 104*e* determines whether the capture of a still image has been instructed (step S710). When the first capturing command is input via the first operation interface 101 or the second capturing command is received by the first communication module 102, it is determined that the capture of the still image has been instructed. Furthermore, when the first capturing command is not input via the first operation interface 101 or the second capturing command is not received by the first communication module 102, it is determined that the capture of the still image has not been instructed.

When it is determined that the capture of the still image has not been instructed, a process of step S714 is performed. Furthermore, when it is determined that the capture of the still image has been instructed, the first control unit 104*e* transmits a capturing command of the still image to the imaging module 100, and allows the imaging module 100 to perform capture and generate the still image (step S711). In this way, the imaging module 100 generates the still image by performing the capturing. The generated still image is output to the first control unit 104*e*.

After the still image is generated, the information addition unit 1040 adds the transmission information generated in step S702 or step S703 and the mounting information generated in any one of step S706 to step S709 to the still image generated in step S711 based on the first capturing command or the second capturing command (step S712). After the transmission information and the mounting information are added to the still image, the first control unit 104*e* stores the still image with the transmission information and the mounting information in the storage module 105 (step S713). In this way, the storage module 105 stores the still image with the transmission information and the mounting information.

After the still image is stored in the storage module 105, the first control unit 104*e* determines whether to end the capturing (step S714). When a capturing end command is input via the first operation interface 101 or when a capturing end command is received by the first communication module 102, it is determined to end the capturing. Furthermore, when the capturing end command is not input via the first operation interface 101 or when the capturing end command is not received by the first communication module 102, it is determined not to end the capturing.

When it is determined to end the capturing, the procedure of the capturing mode is ended. Furthermore, when it is determined not to end the capturing, the process of step S700 is performed. After the process of step S713 is performed, the procedure of the capturing mode may be forcibly ended without performing the determination of step S714.

Figure 17:
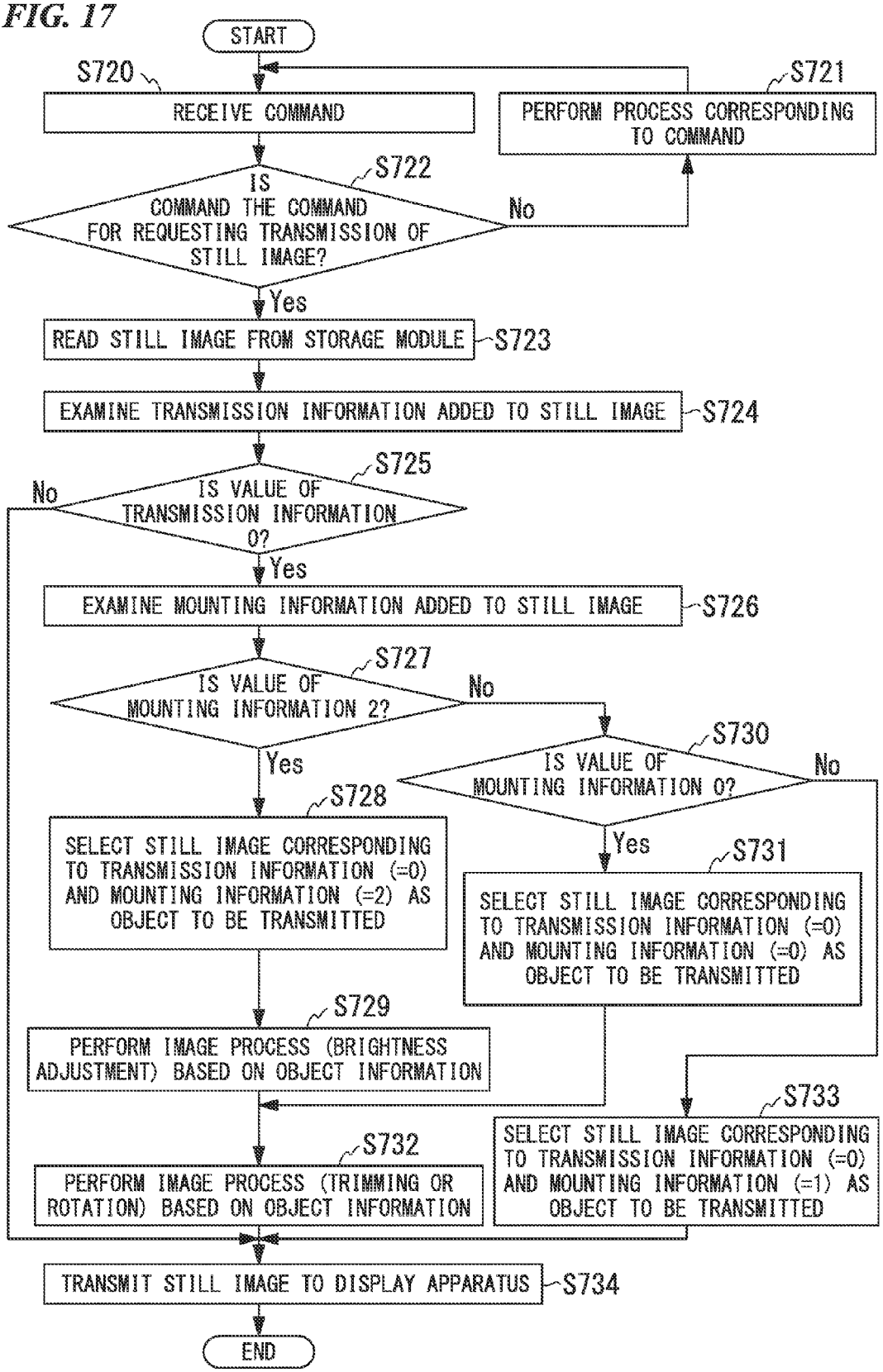
FIG. 17 is a flowchart showing an example of a procedure of an operation of an imaging apparatus according to a seventh embodiment of the present invention.

FIG. 17 shows an example of a procedure of the operation of the imaging apparatus 14 performed after the operation showed in FIG. 16 is performed. The operation of the imaging apparatus 14 will be described with reference to FIG. 17.

Since processes of steps S720 to S725 are similar to those of steps S200 to S205 of FIG. 5, a description thereof will be omitted. When it is determined that the value of the transmission information is 0 in step S725, that is, when the transmission of the live image was not performed when the still image was captured, the first control unit 104*e* examines the mounting information added to the still image read from the storage module 105 in step S723 (step S726).

The first control unit 104*e* determines whether a value of the mounting information examined in step S726 is 2 (step S727). When it is determined that the value of the mounting information is 2, that is, when no display interface was mounted on the imaging apparatus 14 or when an unknown display interface, other than the OVF and the EVF, was mounted on the imaging apparatus 14 when the still image was captured, the image selection unit 1041 selects a still image corresponding to the transmission information having a value of 0 and the mounting information having a value of 2 as an object to be transmitted (step S728). The selected still image is output to the image processing unit 1042.

After the still image is selected, the image processing unit 1042 performs an image process based on object information (for example, luminance information of an object) on the selected still image (step S729). For example, the image processing unit 1042 adjusts brightness such that a specific object (a face and the like of a person) is further brightened. Alternatively, the image processing unit 1042 may also adjust brightness such that a halation generation part is further darkened.

After the image process is performed, the image processing unit 1042 performs an image process based on object information (for example, position information or orientation information of an object) on the selected still image, which is a process different from the image process performed in step S729 (step S732). For example, the image processing unit 1042 trims a part including a specific object (a face and the like of a person). Alternatively, the image processing unit 1042 may also perform a process of rotating the still image based on the orientation information of an object.

In step S732, the image processing unit 1042 may also perform an image process corresponding to a capturing scene. For example, when the capturing scene is a landscape background, the image processing unit 1042 may also perform a process of rotating a still image such that a specific object (a horizontal line and the like) has a specific slope (is level with an image, and the like).

After the image process is performed, the first control unit 104e allows the first communication module 102 to transmit the still image subjected to the image process to the display apparatus 20 (step S734). In this way, the first communication module 102 transmits the still image subjected to the image process to the display apparatus 20.

After the still image is transmitted, the procedure showed in FIG. 17 is ended. Furthermore, when it is determined that the value of the transmission information is 1 in step S725, that is, when the transmission of the live image was being performed when the still image was captured, the still image corresponding to the transmission information is selected by the image selection unit 1041 and is transmitted to the display apparatus 20 in step S734.

When it is determined that the value of the transmission information is not 2 in step S727, the first control unit 104e determines whether the value of the mounting information examined in step S726 is 0 (step S730). When it is determined that the value of the mounting information is 0, that is, when the OVF was mounted on the imaging apparatus 14 when the still image was captured, the image selection unit 1041 selects a still image corresponding to the transmission information having a value of 0 and the mounting information having a value of 0 as an object to be transmitted (step S731). The selected still image is output to the image processing unit 1042 and is subjected to the image process in step S732.

When it is determined that the value of the mounting information is not 0 in step S730, that is, when the value of the mounting information is 1 and the EVF was mounted on the imaging apparatus 14 when the still image was captured, the image selection unit 1041 selects a still image corresponding to the transmission information having a value of 0 and the mounting information having a value of 1 as an object to be transmitted (step S733). The selected still image is output to the first communication module 102, and is transmitted to the display apparatus 20 by the first communication module 102 in step S734. In any one of steps S731 and S733, the image selection unit 1041 selects the still image with the transmission information indicating that the transmission of the live image was not performed and the mounting information indicating that the display interface was mounted on the imaging apparatus 14.

After the process of step S734 is performed, a process similar to that of step S208 of FIG. 5 may be performed and the transmission of the still image may be repeated. Furthermore, when it is determined that the value of the mounting information is 1 in step S730, that is, when the EVF was mounted on the imaging apparatus 14 when the still image was captured, an image process different from that performed in step S732 may be performed on the still image. Furthermore, when it is determined that the value of the transmission information is 0 in step S725, that is, when the transmission of the live image was not being performed when the still image was captured, a process similar to the image process performed in step S407 of FIG. 10 may be performed.

When no command is received from the display apparatus 20 and the transmission command of the still image is input via the first operation interface 101, the processes after step S723 may be performed. Accordingly, the processes of steps S720 to S722 are optional in the present embodiment.

Furthermore, when it is determined that the value of the transmission information is 1 in step S725, that is, when the transmission of the live image was being performed when the still image was captured, the still image may not be transmitted to the display apparatus 20. Accordingly, the transmission of the still image generated after the transmission of the live image is performed is optional in the present embodiment.

In the present embodiment, the still image generated in the state in which the transmission of the live image is not being performed and the display interface is mounted on the imaging apparatus 14 can be distinguished from the still image generated after the transmission of the live image is performed, and then the image process can be performed. In this way, it is possible to generate a still image proper for capturing using the display interface.

Furthermore, in the present embodiment, it is possible to perform an image process corresponding to the type of the display interface on the still image generated in the state in which the transmission of the live image is not being performed and the display interface is mounted on the imaging apparatus 14. In this way, it is possible to generate a still image proper for the used display interface.

(Eighth Embodiment)

Figure 18:
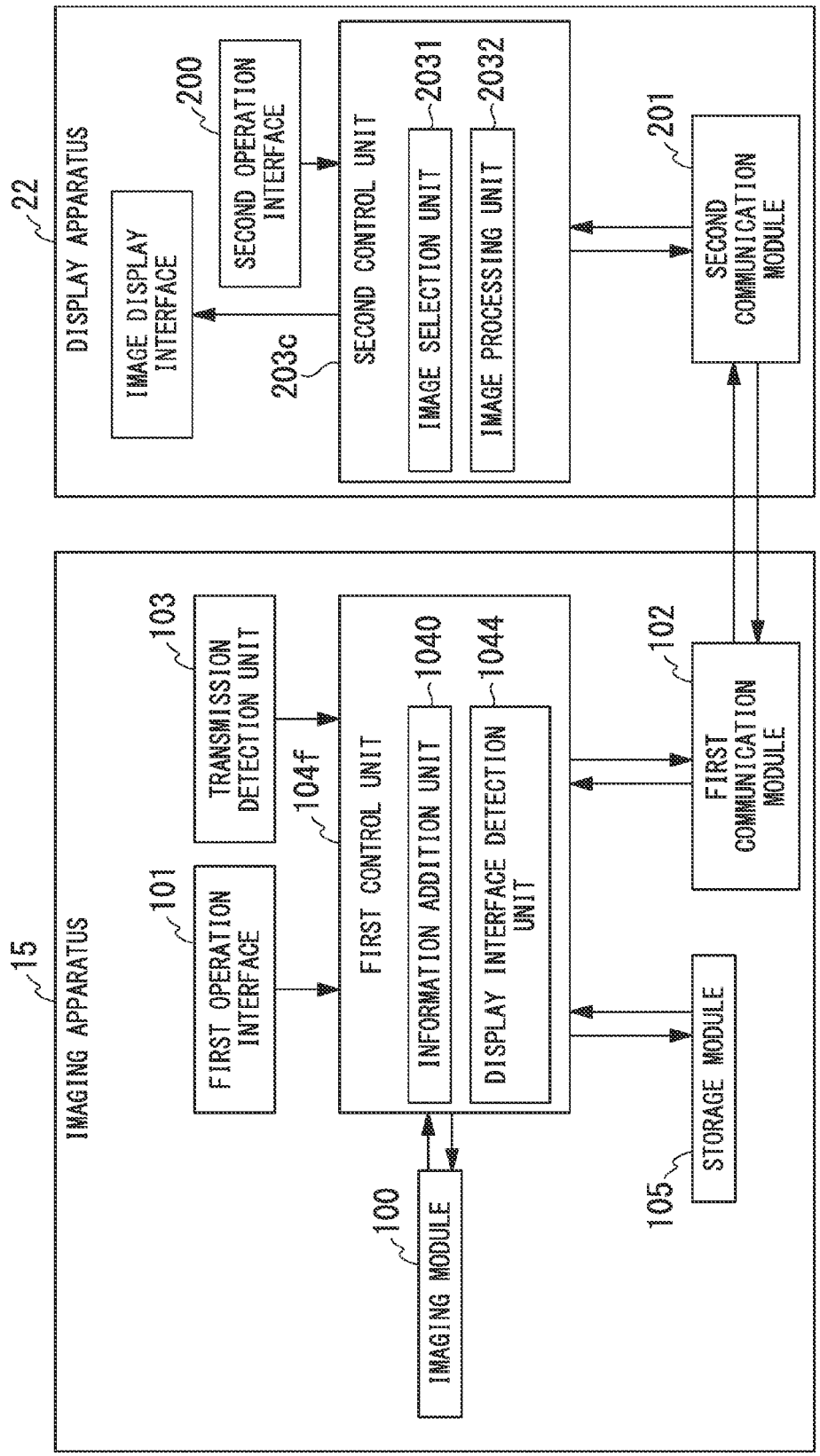
FIG. 18 is a block diagram showing a configuration example of an imaging system according to an eighth embodiment of the present invention.

Next, an eighth embodiment of the present invention will be described. FIG. 18 shows a configuration example of an imaging system according to the present embodiment. The imaging system showed in FIG. 18 includes an imaging apparatus 15 and the display apparatus 22. Since the configuration of the display apparatus 22 has been previously described, a description thereof will be omitted.

The imaging apparatus 15 includes the imaging module 100, the first operation interface 101, the first communication module 102, the transmission detection unit 103, a first control unit 104f, and the storage module 105. Description of previously described elements will be omitted.

In the present embodiment, the first control unit 104f includes the information addition unit 1040 and a display interface detection unit 1044. The function of the first control unit 104f may be performed by software. In the present embodiment, the imaging apparatus 15 performs the procedure showed in FIG. 16 when the still image is captured.

In the present embodiment, the first communication module 102 transmits the still image, the transmission information, and the mounting information to the display apparatus 22. The information addition unit 1040 adds the mounting information to the still image generated based on the first capturing command or the second capturing command. The storage module 105 stores the still image with the transmission information and the mounting information. The second communication module 201 receives the still image, the transmission information, and the mounting information from the imaging apparatus 15. The image selection unit 2031 selects the still image with the transmission information indicating that the transmission of the live image is not being performed and the mounting information from still images received by the second communication module 201. The mounting information added to the selected still image indicates that a display interface is mounted on the imaging apparatus 15 before the first capturing command is input via the first operation interface 101 or the second capturing command is received by the first communication module 102. The image processing unit 2032 performs an image process on the still image selected by the image selection unit 2031.

Furthermore, in the present embodiment, when it is detected that the display interface is mounted on the imaging apparatus 15, the display interface detection unit 1044 identifies the type of the display interface. The information addition unit 1040 adds the mounting information to the still image generated based on the first capturing command or the second capturing command. The mounting information indicates whether the display interface is mounted on the imaging apparatus 15 before the first capturing command is input via the first operation interface 101 or before the second capturing command is received by the first communication module 102 and indicates the type of the display interface when the display interface is mounted on the imaging apparatus 15. The image processing unit 2032 performs an image process corresponding to the type of the display interface indicated by the mounting information on the still image selected by the image selection unit 2031.

Figure 19:
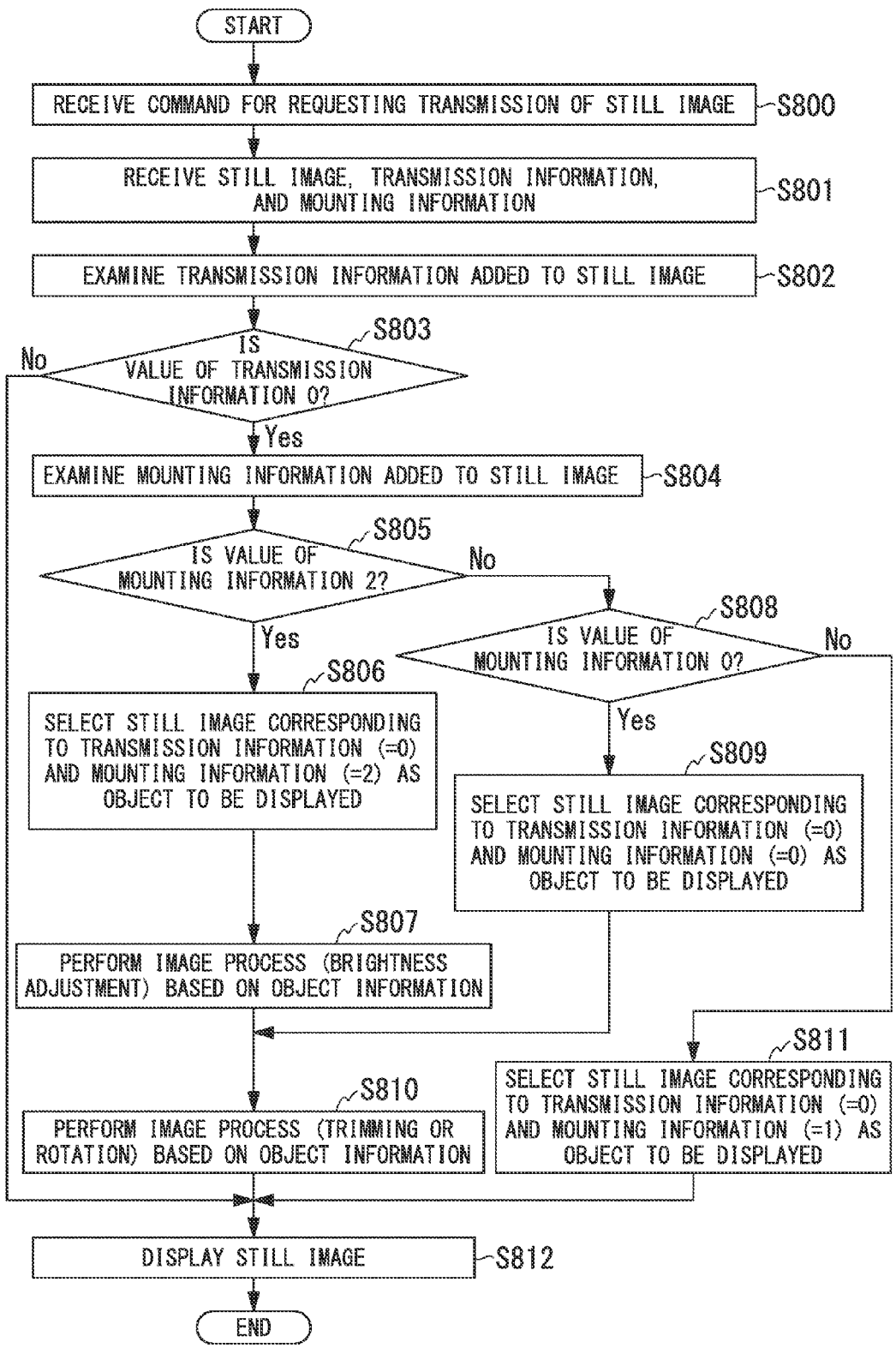
FIG. 19 is a flowchart showing an example of a procedure of an operation of a display apparatus according to an eighth embodiment of the present invention.

FIG. 19 shows an example of a procedure of the operation of the display apparatus 22. The operation of the display apparatus 22 will be described with reference to FIG. 19.

When the procedure is started, the second control unit 203c allows the second communication module 201 to transmit a command for requesting the transmission of a still image to the imaging apparatus 15 (step S800). In this way, the second communication module 201 transmits the command for requesting the transmission of a still image to the imaging apparatus 15.

The command transmitted by the display apparatus 22 is received by the imaging apparatus 15 in step S300 of FIG. 7. In step S301, the first control unit 104f allows the first communication module 102 to transmit any one of the still images stored in the storage module 105 to the display apparatus 22. In this way, the first communication module 102 transmits any one of the still images stored in the storage module 105 to the display apparatus 22.

When the transmission information and the mounting information are embedded in the still image, the transmission information and the mounting information are transmitted by transmitting the still image. When the still image, the transmission information, and the mounting information are separate and correlated, the imaging apparatus 15 may simultaneously transmit the still image, the transmission information, and the mounting information, or the imaging apparatus 10 may sequentially transmit the still image, the transmission information, and the mounting information.

After the command is transmitted in step S800, the second control unit 203c allows the second communication module 201 to receive the still image, the transmission information, and the mounting information transmitted by the imaging apparatus 15 (step S801). In this way, the second communication module 201 receives the still image, the transmission information, and the mounting information transmitted by the imaging apparatus 10. The received still image, transmission information, and mounting information are output to the second control unit 203c.

Since processes of steps S802 and S803 are similar to those of steps S502 and S503 of FIG. 12, a description thereof will be omitted. When it is determined that the value of the transmission information is 0 in step S803, that is, when the transmission of the live image was not performed when the still image was captured, the second control unit 203c examines the mounting information added to the still image received in step S801 (step S804).

The second control unit 203c determines whether a value of the mounting information examined in step S804 is 2 (step S805). When it is determined that the value of the mounting information is 2, that is, when no display interface was mounted on the imaging apparatus 15 or an unknown display interface other than the OVF and the EVF was mounted on the imaging apparatus 15 when the still image was captured, the image selection unit 2031 selects a still image corresponding to the transmission information having a value of 0 and the mounting information having a value of 2 as an object to be displayed (step S806). The selected still image is output to the image processing unit 2032.

After the still image is selected, the image processing unit 2032 performs an image process based on object information (for example, luminance information of an object) on the selected still image (step S807). For example, the image processing unit 2032 adjusts brightness such that a specific object (a face and the like of a person) is further brightened. Alternatively, the image processing unit 2032 may also adjust brightness such that a part in which halation occurs is further darkened.

After the image process is performed, the image processing unit 2032 performs an image process based on object information (for example, position information or orientation information of an object) on the selected still image, which is a process different from the image process performed in step S807 (step S810). For example, the image processing unit 2032 trims a part including a specific object (a face and the like of a person). Alternatively, the image processing unit 2032 may also perform a process of rotating the still image based on the orientation information of an object.

In step S810, the image processing unit 2032 may also perform an image process corresponding to a scene being captured. For example, when the scene being captured is a landscape background, the image processing unit 2032 may also perform a process of rotating a still image such that a specific object (a horizontal line and the like) has a specific slope (is level with an image, and the like).

After the image process is performed, the second control unit 203c allows the image display interface 202 to display the still image subjected to the image process (step S812). In this way, the image display interface 202 displays the still image subjected to the image process.

After the still image is displayed, the procedure showed in FIG. 19 is ended. Furthermore, when it is determined that the value of the transmission information is 1 in step S803, that is, when the transmission of the live image was performed when the still image was captured, the still image corresponding to the transmission information is selected by the image selection unit 2031 and is transmitted to the display apparatus 22 in step S812.

When it is determined that the value of the mounting information is not 2 in step S805, the second control unit 203c determines whether the value of the mounting information examined in step S804 is 0 (step S808). When it is determined that the value of the mounting information is 0, that is, when the OVF was mounted on the imaging apparatus 15 when the still image was captured, the image selection unit 2031 selects a still image corresponding to the transmission information having a value of 0 and the mounting information having a value of 0 as an object to be displayed (step S809). The selected still image is output to the image processing unit 2032 and is subjected to the image process in step S810.

When it is determined that the value of the mounting information is not 0 in step S808, that is, when the value of the mounting information is 1 and the EVF was mounted on the imaging apparatus 15 when the still image was captured, the image selection unit 2031 selects a still image corresponding to the transmission information having a value of 0 and the mounting information having a value of 1 as an object to be displayed (step S811). The selected still image is output to the image display interface 202 and is displayed by the image display interface 202 in step S812. In any one of steps S809 and S811, the image selection unit 2031 selects the still image with the transmission information indicating that the transmission of the live image was been performed and the mounting information indicating that the display interface is mounted on the imaging apparatus 15.

After the process of step S812 is performed, a process similar to that of step S357 of FIG. 8 may be performed and the reception of the still image and the transmission information may be repeated. Furthermore, when it is determined that the value of the mounting information is 1 in step S808, that is, when the EVF was mounted on the imaging apparatus 15 when the still image was captured, an image process different from that performed in step S810 may be performed on the still image. Furthermore, when it is determined that the value of the transmission information is 0 in step S803, that is, when the transmission of the live image was not performed when the still image was captured, a process similar to the image process of step S505 of FIG. 13 may be performed.

The display apparatus 22 may not transmit the command for requesting the transmission of the still image. For example, when the transmission command of the still image is input via the first operation interface 101, the imaging apparatus 15 may transmit the still image and the transmission information to the display apparatus 22. Accordingly, the process of step S800 is optional in the present embodiment.

Furthermore, when it is determined that the value of the transmission information is 1 in step S803, that is, when the transmission of the live image was performed when the still image was captured, the still image may not be displayed. Accordingly, the display of the still image generated after the transmission of the live image is performed is optional in the present embodiment.

In the present embodiment, the still image generated in the state in which the transmission of the live image is not being performed and the display interface is mounted on the imaging apparatus 15 can be distinguished from the still image generated after the transmission of the live image is performed, and then the image process can be performed. In this way, it is possible to generate a still image proper for capturing using the display interface. Furthermore, the display apparatus 22 performs an image process, so that it is possible to perform a more complex image process using the second control unit 203c of the display apparatus 22 than in the seventh embodiment in which the imaging apparatus 14 performs an image process Furthermore, in the present embodiment, it is possible to perform an image process corresponding to the type of the display interface on the still image generated in the state in which the transmission of the live image is not being performed and the display interface is mounted on the imaging apparatus 15. In this way, it is possible to generate a still image proper for the used display interface.

While preferred embodiments of the invention have been described and showed above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging apparatus comprising:
an imaging module configured to continuously generate a live image and perform capture to generate still images;
an operation interface configured to receive an operation of a user who inputs a first capturing command;
a communication module configured to transmit the live image to a display apparatus and receive a second capturing command from the display apparatus, wherein the display apparatus parallelly receives and displays the live image;
a transmission detection unit configured to detect whether the live image is being transmitted to the display apparatus;
an information addition unit configured to add transmission information indicating whether the transmission of the live image is being performed before the first capturing command is input or the second capturing command is received to the still images generated based on the first capturing command or the second capturing command; and
a storage module configured to store the still images with the transmission information.

2. The imaging apparatus according to claim 1, further comprising:
an image selection unit configured to select the still image with the transmission information indicating that the transmission of the live image is not performed, from the still images stored in the storage module,
wherein the communication module further transmits the still image selected by the image selection unit to the display apparatus.

3. The imaging apparatus according to claim 2, further comprising:
an image processing unit configured to perform an image process on the still image selected by the image selection unit,
wherein the communication module transmits the still image processed by the image processing unit to the display apparatus.

4. The imaging apparatus according to claim 1, further comprising:
a capture control unit configured to control an imaging parameter of the imaging module when the transmission of the live image is not being performed before the first capturing command is input or the second capturing command is received.

5. The imaging apparatus according to claim 1, further comprising:
a display interface detection unit configured to detect whether a display interface is mounted on the imaging apparatus,
wherein the display interface is detachable from the imaging apparatus and displaying an optical image of an object or the live image, and
wherein the information addition unit further adds mounting information indicating whether the display interface is mounted on the imaging apparatus before the first capturing command is input or the second capturing command is received to the still images generated based on the first capturing command or the second capturing command, and
a storage module stores the still images with the transmission information and the mounting information.

6. The imaging apparatus according to claim 5, further comprising:
an image selection unit configured to select the still image with both the transmission information indicating that the transmission of the live image was not performed and mounting information indicating that the display interface was mounted from the still images stored in the storage module; and
an image processing unit configured to perform an image process on the still image selected by the image selection unit,
wherein the communication module further transmits the still image processed by the image processing unit to the display apparatus.

7. The imaging apparatus according to claim 6,
wherein the display interface detection unit further identifies a type of the display interface when it is detected that the display interface is mounted on the imaging apparatus,
the information addition unit adds mounting information to the still images generated based on the first capturing command or the second capturing command, wherein the mounting information indicates whether the display interface is mounted on the imaging apparatus before the first capturing command is input or the second capturing command is received and indicates the type of the display interface when the display interface is mounted on the imaging apparatus, and
the image processing unit performs an image process according to the type of the display interface indicated by the mounting information on the still image selected by the image selection unit.

8. An imaging system including an imaging apparatus and a display apparatus,
wherein the imaging apparatus comprises:
an imaging module configured to continuously generate a live image and perform capture to generate still images;
a first operation interface configured to receive an operation of a user who inputs a first capturing command;
a first communication module configured to transmit the live image to the display apparatus and receive a second capturing command from the display apparatus;
a transmission detection unit configured to detect whether the live image is being transmitted to the display apparatus;
an information addition unit configured to add transmission information indicating whether the transmission of the live image is being performed before the first capturing command is input or the second capturing command is received to the still images generated based on the first capturing command or the second capturing command; and
a storage module configured to store the still images with the transmission information, and
wherein the display apparatus comprises:
a second operation interface configured to receive an operation of a user who inputs the second capturing command;
a second communication module configured to receive the live image from the imaging apparatus and transmit the second capturing command to the imaging apparatus; and
an image display interface configured to receive and display the live image.

9. The imaging system according to claim 8,
wherein the first communication module further transmits the transmission information, identification information for identifying the still image with the transmission information, and the still image to be transmitted to the display apparatus, and receives designation information for designating the still image to be transmitted from the display apparatus,
the second communication module further receives the transmission information, the identification information, and the still image to be transmitted from the imaging apparatus, and transmits the designation information to the imaging apparatus, and
the display apparatus further comprises:
an image designation unit configured to generate the designation information from the identification information corresponding to the transmission information indicating that the transmission of the live image is not being performed.

10. The imaging system according to claim 8,
wherein the first communication module further transmits the still image and the transmission information to the display apparatus,
the second communication module further receives the still image and the transmission information from the imaging apparatus, and
the display apparatus further comprises:
an image selection unit configured to select the still image with the transmission information indicating that the transmission of the live image was not performed from the still images received by the second communication module; and
an image processing unit configured to perform an image process on the still image selected by the image selection unit.

11. The imaging system according to claim 8,
wherein the imaging apparatus further comprises a display interface detection unit configured to detect whether a display interface is mounted on the imaging apparatus, the display interface being detachable from the imaging apparatus and displaying an optical image of an object or the live image,
the first communication module further transmits the still image, the transmission information, and mounting information indicating whether the display interface is mounted on the imaging apparatus before the first capturing command is input or the second capturing command is received to the display apparatus,
the information addition unit further adds the mounting information to the still images generated based on the first capturing command or the second capturing command,
the storage module stores the still images with both the transmission information and the mounting information,
the second communication module further receives the still image, the transmission information, and the mounting information from the imaging apparatus, and
the display apparatus further comprises:
an image selection unit configured to select the still image with both the transmission information indicating that the transmission of the live image was not performed and mounting information indicating that the display interface was mounted on the imaging apparatus from the still images received by the second communication module; and an image processing unit configured to perform an image process on the still image selected by the image selection unit.

12. The imaging system according to claim 11, wherein the display interface detection unit further identifies a type of the display interface when it is detected that the display interface is mounted on the imaging apparatus, the information addition unit adds mounting information indicating whether the display interface is mounted on the imaging apparatus before the first capturing command is input or the second capturing command is received and indicates the type of the display interface when the display interface is mounted on the imaging apparatus to the still images generated based on the first capturing command or the second capturing command, and the image processing unit performs an image process according to the type of the display interface indicated by the mounting information on the still image selected by the image selection unit.

13. An imaging method comprising:

a step in which a transmission detection unit configured to detect whether a live image is being transmitted to a display apparatus that parallelly receives and displays the live image continuously generated by an imaging module performs detection;

a step in which the imaging module performs capturing to generate a still image when a first capturing command is input via an operation interface or when a second capturing command is received from the display apparatus by a communication module;

a step in which an information addition unit configured to add transmission information indicating whether the transmission of the live image is being performed before the first capturing command is input or the second capturing command is received to a still image generated based on the first capturing command or the second capturing command performs addition; and a step in which a storage module stores the still image with the transmission information.

14. A computer program stored on a non-transitory computer readable storage medium, causing a computer to execute:

a step of allowing a transmission detection unit configured to detect whether a live image is being transmitted to a display apparatus that parallelly receives and displays the live image continuously generated by an imaging module to perform detection;

a step of allowing the imaging module to perform capture to generate a still image when a first capturing command is input via an operation interface or when a second capturing command is received from the display apparatus by a communication module;

a step of adding transmission information indicating whether the transmission of the live image is being performed before the first capturing command is input or the second capturing command is received to the still image generated based on the first capturing command or the second capturing command; and a step of allowing a storage module to store the still image with the transmission information.

* * * * *